United States Patent
Zhou et al.

(10) Patent No.: US 10,097,315 B2
(45) Date of Patent: Oct. 9, 2018

(54) GROUP SCHEDULING AND ACKNOWLEDGEMENT FOR WIRELESS TRANSMISSION

(71) Applicant: QUALCOMM Incorporated, San Diego, CA (US)

(72) Inventors: Yan Zhou, San Diego, CA (US); Santosh Paul Abraham, San Diego, CA (US); Gwendolyn Denise Barriac, Encinitas, CA (US); Simone Merlin, Solana Beach, CA (US); Rahul Tandra, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/255,946

(22) Filed: Apr. 17, 2014

(65) Prior Publication Data
US 2014/0314004 A1  Oct. 23, 2014

Related U.S. Application Data

(60) Provisional application No. 61/813,775, filed on Apr. 19, 2013, provisional application No. 61/821,178, filed on May 8, 2013.

(51) Int. Cl.
*H04L 1/16* (2006.01)
*H04L 5/00* (2006.01)
(Continued)

(52) U.S. Cl.
CPC ............. *H04L 1/16* (2013.01); *H04B 7/0452* (2013.01); *H04L 1/1671* (2013.01);
(Continued)

(58) Field of Classification Search
None
See application file for complete search history.

(56) References Cited

U.S. PATENT DOCUMENTS 6,567,416 B1 * 5/2003 Chuah ................. H04L 12/2602
  370/347
7,436,801 B1 * 10/2008 Kanterakis .......... H04W 74/008
  370/329
(Continued)

FOREIGN PATENT DOCUMENTS

CN  101129024 A  2/2008
CN  102412944 A  4/2012
(Continued)

OTHER PUBLICATIONS

International Search Report and Written Opinion—PCT/US2014/034638—ISA/EPO—dated Aug. 8, 2014.

*Primary Examiner* — Michael J Moore, Jr.
(74) *Attorney, Agent, or Firm* — Arent Fox, LLP

(57) ABSTRACT

An acknowledgment (ACK) frame has two parts: a group ACK part and a scheduling information part. In the group ACK part, an ACK/NACK indicator is included for a previous uplink (UL) transmission per station (STA). In the scheduling information part, information included for the following UL transmission per selected STA may comprise, for example, one or more of: a number of selected STAs, a media access control (MAC) address of each selected STA, a data transmission duration per selected STA, a transmission rate per selected STA, a request transmission duration, a pilot transmission order, or a STA transmission order.

29 Claims, 23 Drawing Sheets

(51) Int. Cl.
*H04B 7/0452* (2017.01)
*H04L 1/00* (2006.01)

(52) U.S. Cl.
CPC .......... *H04L 5/0007* (2013.01); *H04L 5/0055* (2013.01); *H04L 2001/0093* (2013.01)

(56) References Cited

U.S. PATENT DOCUMENTS

| | | | |
|---|---|---|---|
| 8,665,906 B1* | 3/2014 | Liu | H04B 7/0617 370/349 |
| 8,929,319 B2* | 1/2015 | Anderson | 370/329 |
| 8,976,741 B2 | 3/2015 | Wentink | |
| 2004/0196871 A1 | 10/2004 | Terry | |
| 2007/0060167 A1 | 3/2007 | Damnjanovic et al. | |
| 2008/0301799 A1* | 12/2008 | Arnold | G06F 21/6218 726/14 |
| 2009/0109884 A1* | 4/2009 | Kwon | H04L 1/007 370/310 |
| 2009/0245194 A1* | 10/2009 | Damnjanovic | H04L 1/1607 370/329 |
| 2010/0054188 A1 | 3/2010 | Matsumoto et al. | |
| 2010/0074198 A1* | 3/2010 | Morioka | H04L 12/413 370/329 |
| 2010/0080173 A1* | 4/2010 | Takagi | H04L 27/0006 370/328 |
| 2011/0038332 A1* | 2/2011 | Liu | H04L 1/1685 370/329 |
| 2011/0090855 A1 | 4/2011 | Kim | |
| 2011/0150004 A1* | 6/2011 | Denteneer | H04L 5/0023 370/476 |
| 2011/0235593 A1 | 9/2011 | Gong et al. | |
| 2011/0235596 A1 | 9/2011 | Wentink | |
| 2011/0286402 A1* | 11/2011 | Gong | H04L 1/1685 370/329 |
| 2012/0195292 A1* | 8/2012 | Ko | H04L 1/0027 370/336 |
| 2012/0314674 A1* | 12/2012 | Seo | H04L 1/1861 370/329 |
| 2013/0136066 A1* | 5/2013 | Kim | H04W 72/10 370/329 |
| 2013/0176864 A1* | 7/2013 | Quan | H04W 72/0473 370/245 |
| 2013/0176998 A1* | 7/2013 | Choudhury | H04W 48/12 370/338 |
| 2013/0223210 A1* | 8/2013 | Asterjadhi | H04L 1/0025 370/230 |
| 2013/0223345 A1* | 8/2013 | Asterjadhi | H04L 69/04 370/328 |
| 2013/0223427 A1* | 8/2013 | Sohn | H04W 74/06 370/338 |
| 2013/0227371 A1* | 8/2013 | Asterjadhi | H04L 1/1614 714/748 |
| 2013/0250904 A1 | 9/2013 | Kang et al. | |
| 2013/0294322 A1 | 11/2013 | Yun et al. | |
| 2013/0301569 A1* | 11/2013 | Wang | H04L 5/0055 370/329 |
| 2013/0336234 A1* | 12/2013 | Ghosh | H04W 72/10 370/329 |
| 2014/0126509 A1* | 5/2014 | You | H04B 7/04 370/329 |
| 2014/0233553 A1* | 8/2014 | Gao | H04L 1/1607 370/338 |
| 2015/0029844 A1* | 1/2015 | Pathmasuntharam | H04W 28/22 370/230 |
| 2015/0131494 A1* | 5/2015 | He | H04B 7/0469 370/280 |
| 2015/0201401 A1* | 7/2015 | Lahetkangas | H04L 1/0079 370/329 |
| 2015/0312004 A1 | 10/2015 | Zhou et al. | |

FOREIGN PATENT DOCUMENTS

| | | |
|---|---|---|
| WO | 2008114510 A1 | 9/2008 |
| WO | 2010099496 A1 | 9/2010 |
| WO | WO-2011038154 A1 | 3/2011 |
| WO | 2011112741 A1 | 9/2011 |

* cited by examiner

GROUP SCHEDULING AND
ACKNOWLEDGEMENT FOR WIRELESS
TRANSMISSION

CLAIM OF PRIORITY

This application claims the benefit of and priority to commonly owned U.S. Provisional Patent Application No. 61/813,775, filed Apr. 19, 2013, and U.S. Provisional Patent Application No. 61/821,178, filed May 8, 2013, the disclosure of each of which is hereby incorporated by reference herein.

BACKGROUND

Field

This application relates generally to wireless communication and more specifically, but not exclusively, to group scheduling and acknowledgement.

Introduction

Communication networks enable users to exchange messages among several interacting spatially-separated devices. Communication networks may be classified according to geographic scope, which could be, for example, a wide area, a metropolitan area, a local area, or a personal area. Such networks may be designated respectively as a wide area network (WAN), a metropolitan area network (MAN), a local area network (LAN), or a personal area network (PAN). Communication networks also differ according to the switching technique and/or routing technique employed to interconnect the various network apparatuses and devices. For example, a communication network may use circuit switching, packet switching, or some combination of the two. Communication networks can differ according to the type of physical media employed for transmission. For example, a communication network may support wired communication, wireless communication, or both types of communication. Communication networks can also use different sets of communication protocols. Examples of such communication protocols include the Internet protocol (IP) suite, synchronous optical networking (SONET) protocols, and Ethernet protocols.

In general, wireless networks employ intangible physical media in an unguided propagation mode using electromagnetic waves in radio, microwave, infra-red, optical, or other frequency bands. Consequently, wireless networks are better adapted to facilitate user mobility and rapid field deployment as compared to fixed, wired networks. For example, wireless networks readily support network elements that are mobile and have dynamic connectivity needs. The use of wireless networks also may be preferred for scenarios where it is desirable to provide a network architecture having an ad hoc topology, rather than a fixed topology.

A wireless network may be deployed over a defined geographical area to provide various types of services (e.g., voice, data, multimedia services, etc.) to users within that geographical area. In a typical implementation, one or more access points (APs) are deployed to provide wireless connectivity for access terminals (e.g., stations (STAs)) that are operating within the geographical area served by the wireless network.

Some wireless networks implement Multiple Input Multiple Output (MIMO) technology or Multi-User MIMO (MU-MIMO) technology. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In practice, overhead may be relatively high for uplink (UL) MU-MIMO transmission. For example, in some MU-MIMO systems, for each UL MU-MIMO transmission, an AP needs to send two special clear-to-send (CTS) messages. The first CTS message triggers STAs with buffered data to send requests for a MU-MIMO transmission. The second CTS message indicates the selected access terminals for MU-MIMO transmission based on received requests.

FIG. 1 illustrates an example of this relatively large overhead for an UL MU-MIMO transmission 100. During a first round channel contention, an initiating STA sends a request-to-send (RTS) to indicate that it has UL data to send. The AP then sends an MU-CTS to trigger other STAs with buffered data to send requests for MU-MIMO transmission. During a second round channel contention, the other STAs send RTSs. The AP then sends a global CTS (G-CTS) to indicate the selected STAs for MU-MIMO transmission based on received requests. In this example, STA 1 through STA 3 are selected (e.g., scheduled) to transmit. Finally, the AP sends a global acknowledgement (G-ACK) to acknowledge receipt of the transmission from STA 1 through STA 3.

SUMMARY

A summary of several example aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to overhead reduction for multi-user transmission. Examples of multi-user transmission include, without limitation, UL MU-MIMO transmission, UL orthogonal-frequency-division-multiple-access (OFDMA) transmission, and UL time-domain-scheduled-transmission (TDST) communication (e.g., 802.11 power-save-multi-poll (PSMP)).

In some aspects, a novel acknowledgement (ACK) frame is employed to reduce the number of control frames used in UL MU-MIMO transmission, UL OFDMA transmission, UL TDST transmission, UL scheduled time-frequency transmission, or other types of multi-user transmission.

For example, an AP may combine scheduling functions into an ACK frame. These scheduling functions may include, for example, triggering STAs with buffered data to send requests for transmission (e.g., MU-MIMO transmission) and/or indicating selected STAs for transmission (e.g., MU-MIMO transmission) based on received requests.

In one example, the frame has two parts: a group ACK part and a scheduling information part. In the group ACK part, an ACK/NACK indicator is included for the previous UL transmission per STA. In the scheduling information part, information included for the following UL transmission per selected STA may comprise, for example, one or more of: the number of selected STAs, the MAC address of each selected STA, the data transmission duration per selected STA, the transmission rate (e.g., modulation and coding scheme (MCS)) per selected STA, the request transmission duration (e.g., for UL MU-MIMO), the pilot transmission order (e.g., for UL MU-MIMO), or the STA transmission order (e.g., for an UL scheduled transmission).

Various aspects of the disclosure provide an apparatus configured for communication. The apparatus comprises: a receiver configured to receive data and requests to transmit; a processing system configured to generate a media access control (MAC) frame comprising acknowledgment information associated with the received data and scheduling information associated with the received requests to transmit, wherein the acknowledgement information comprises an indication of a quantity of apparatuses for which the acknowledgement information is generated; and a transmitter configured to transmit the frame.

Other aspects of the disclosure provide a method of communication. The method comprises: receiving data and requests to transmit; generating a media access control (MAC) frame comprising acknowledgment information associated with the received data and scheduling information associated with the received requests to transmit, wherein the acknowledgement information comprises an indication of a quantity of apparatuses for which the acknowledgement information is generated; and transmitting the frame.

Other aspects of the disclosure provide another apparatus configured for communication. The other apparatus comprises: means for receiving data and requests to transmit; means for generating a media access control (MAC) frame comprising acknowledgment information associated with the received data and scheduling information associated with the received requests to transmit, wherein the acknowledgement information comprises an indication of a quantity of apparatuses for which the acknowledgement information is generated; and means for transmitting the frame.

Other aspects of the disclosure provide a computer-program product comprising a computer-readable medium. The computer-readable medium comprises code executable to: receive data and requests to transmit; generate a media access control (MAC) frame comprising acknowledgment information associated with the received data and scheduling information associated with the received requests to transmit, wherein the acknowledgement information comprises an indication of a quantity of apparatuses for which the acknowledgement information is generated; and transmit the frame.

Other aspects of the disclosure provide an access point. The access point comprises: an antenna; a receiver configured to receive data and requests to transmit; a processing system configured to generate a media access control (MAC) frame comprising acknowledgment information associated with the received data and scheduling information associated with the received requests to transmit, wherein the acknowledgement information comprises an indication of a quantity of apparatuses for which the acknowledgement information is generated; and a transmitter configured to transmit the frame via the antenna.

BRIEF DESCRIPTION OF THE DRAWINGS

These and other sample aspects of the disclosure will be described in the detailed description and the claims that follow, and in the accompanying drawings, wherein:

Figure 1:
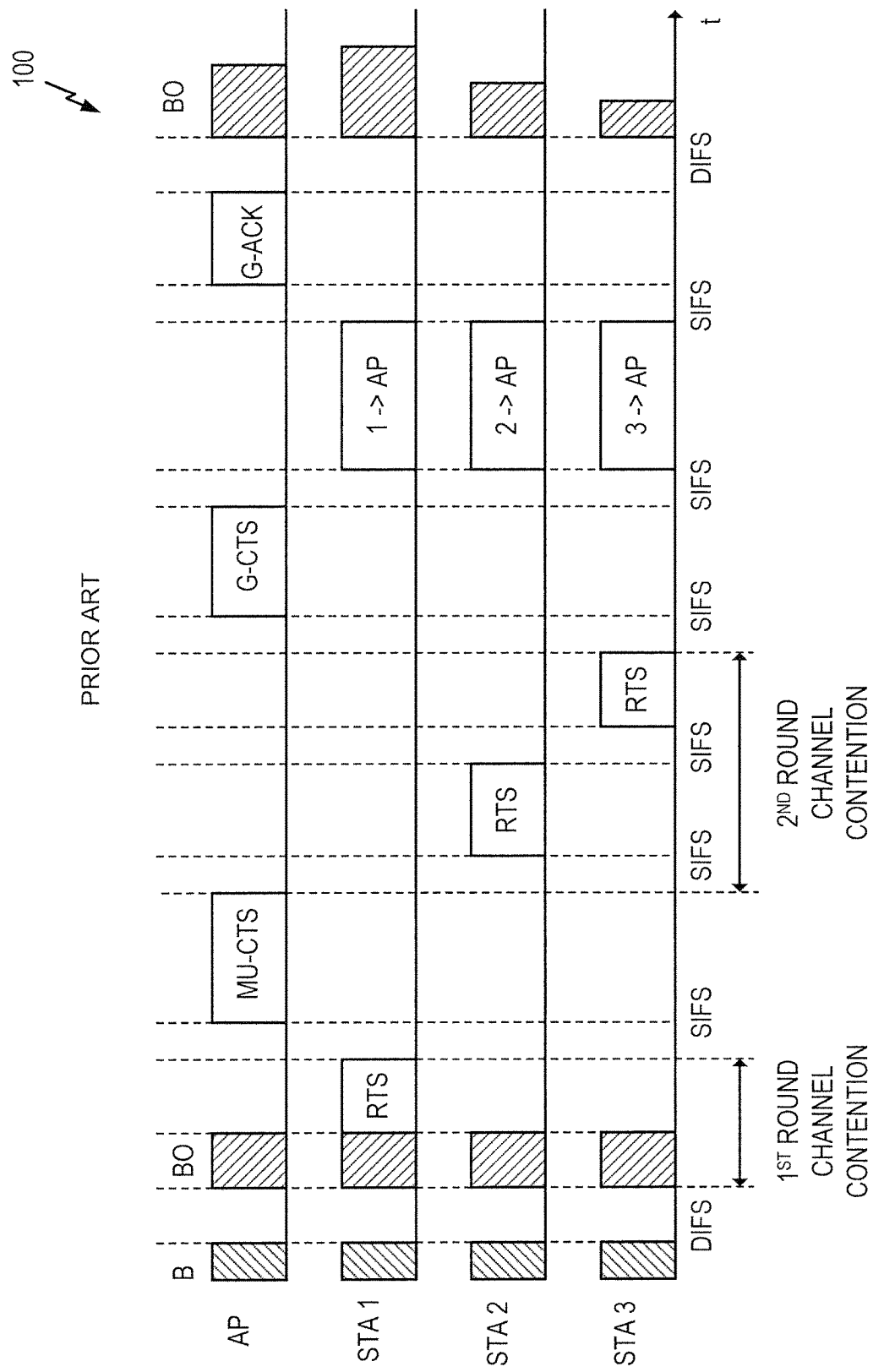
FIG. 1 illustrates an example of a conventional UL MU-MIMO transmission.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim. As an example of the above, in some aspects, a method of wireless communication may comprise receiving data and requests to transmit; generating a media access control (MAC) frame comprising acknowledgment information associated with the received data and scheduling information associated with the received requests to transmit, wherein the acknowledgement information comprises an indication of a quantity of apparatuses for which the acknowledgement information is generated; and transmitting the frame. In addition, in some aspects, the acknowledgement information indicates, for each of the apparatuses, whether data was successfully received from the apparatus.

Figure 2:
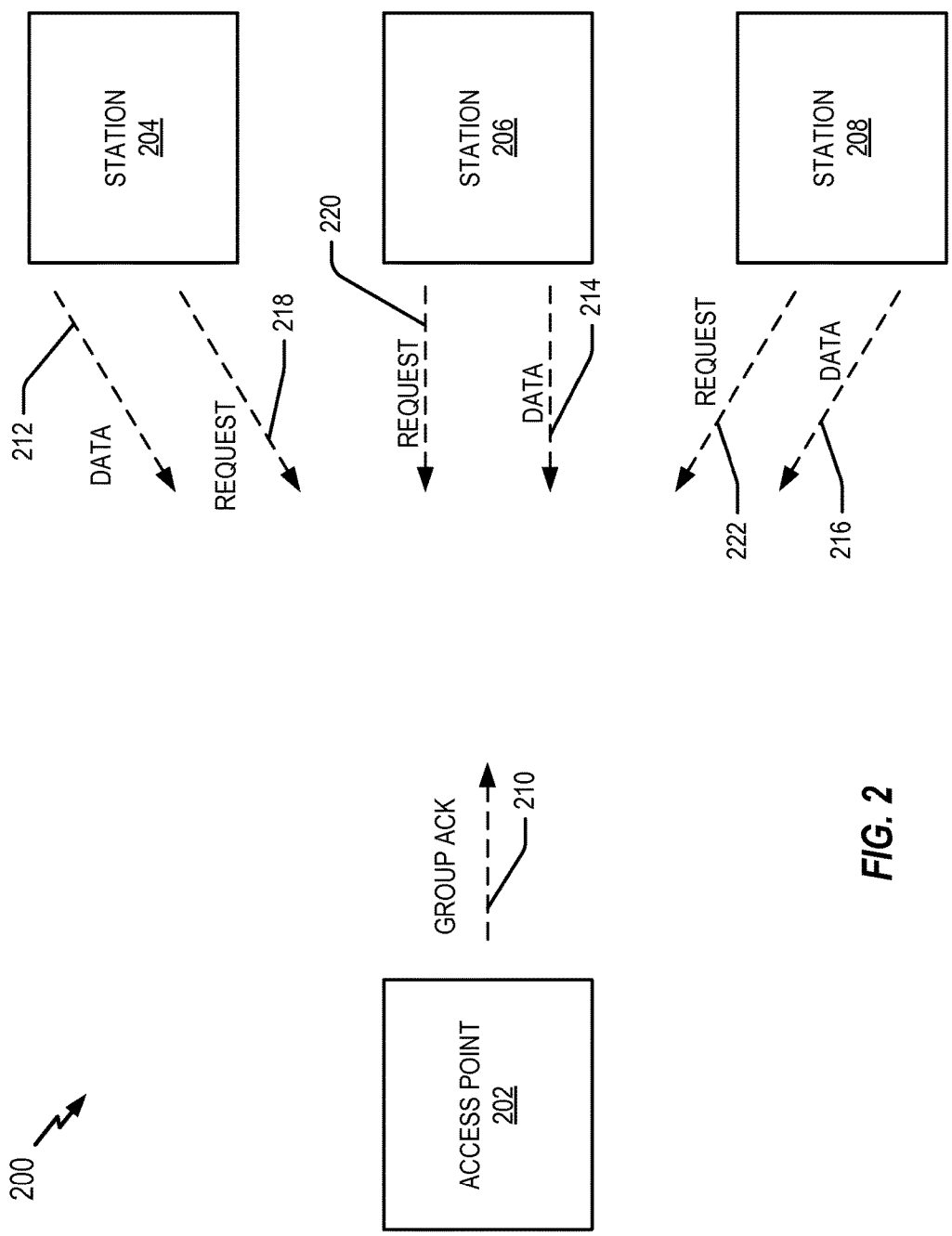
FIG. 2 is a functional block diagram illustrating an example of a wireless communication network employing a group acknowledgment in accordance with some aspects of the disclosure.

FIG. 2 illustrates an example of a wireless communication network 200 including an access point 202 and a plurality of stations 204, 206, and 208. The access point 202 and the stations 204, 206, and 208 support multi-user communication whereby the access point 202 sends a group acknowledgement (ACK) 210 to the stations 204, 206, and 208 in response to respective data transmissions 212, 214, and 216 that the access point 202 receives from the stations 204, 206, and 208, respectively.

As indicated in FIG. 2, the stations 204, 206, and 208 send respective requests to transmit 218, 220, and 222 to the access point 202 whenever they have data to send. In response to the requests to transmit 218, 220, and 222, the access point 202 includes scheduling information in the group ACK 210 to specify whether and/or how any of the stations 204, 206, and 208 are allowed to transmit.

Referring to FIGS. 3-12, various aspects of a sample acknowledgement-aided UL communication scheme are described. For purposes of illustration, these techniques may be described in the context of an IEEE 802.11-based system employing UL MU-MIMO. It should be appreciated, however, that the teachings herein may be implemented using other types of components and/or using other types of communication technology.

Figure 3:
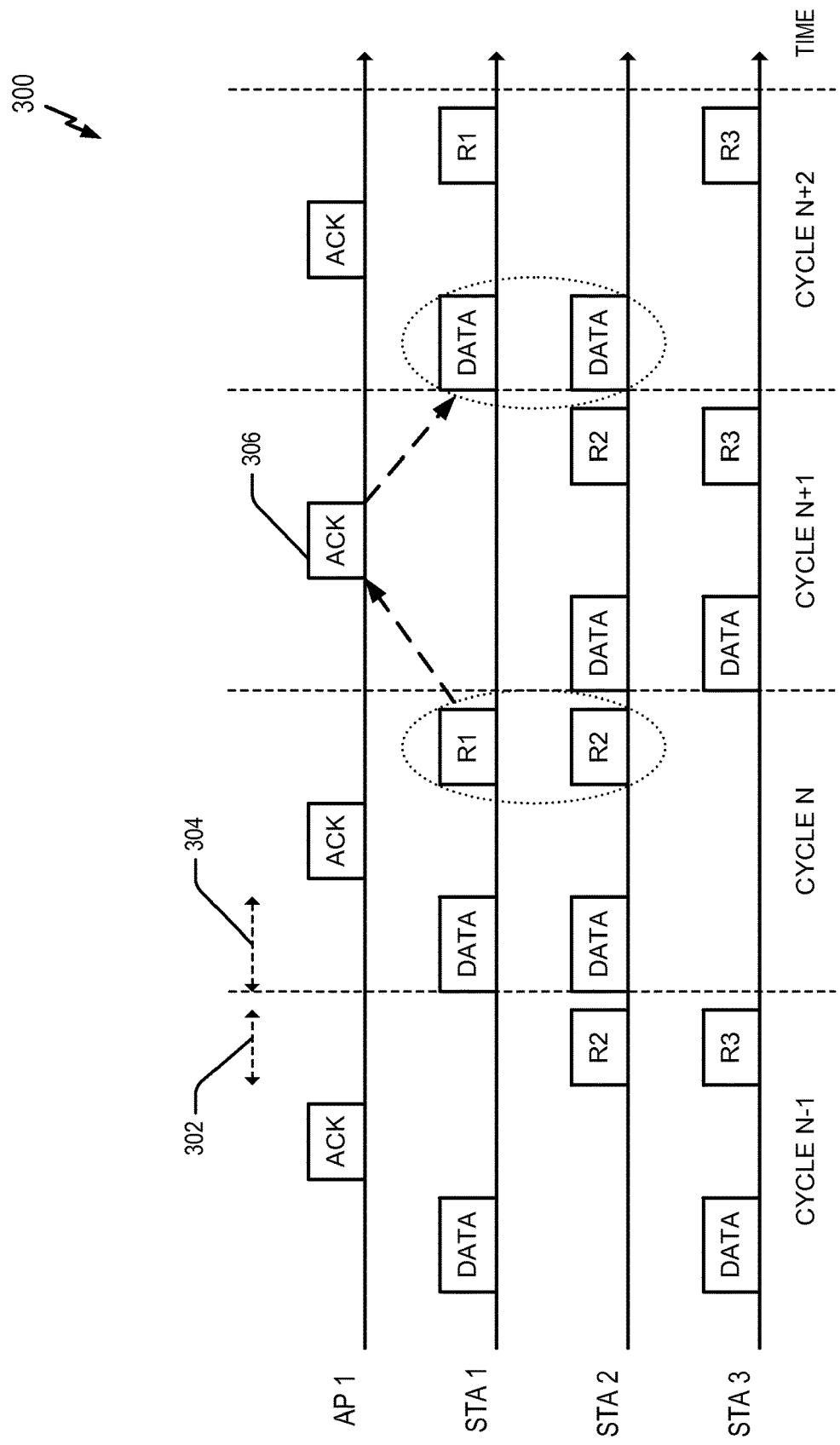
FIG. 3 illustrates an example of an UL MU-MIMO session comprising multiple cycles in accordance with some aspects of the disclosure.

In the example of FIG. 3, an UL MU-MIMO session 300 has multiple cycles, with one MU-MIMO transmission per cycle. Each cycle consists of a MU-MIMO transmission period or interval (e.g., for the data blocks in FIG. 3), an ACK frame, and a request transmission period or interval (e.g., for the request blocks R1, R2, etc., in FIG. 3). In a MU-MIMO transmission period, the AP selects the STAs to send data simultaneously. The AP then sends a group acknowledgement (ACK) to indicate the pass/fail result per STA. In the following request transmission period, STAs with buffered data send requests for the next MU-MIMO transmission. The above three sections can be separated by a fixed duration (e.g., short interframe space (SIFS)).

An ACK may include scheduling information for future MU-MIMO transmission. For example, as indicated, the ACK 306 may indicate selected STAs for MU-MIMO transmission in cycle n+2 based on requests received in cycle n (see the dashed ovals in FIG. 3). The ACK also may indicate the start times and/or the durations of the following request transmission interval 302 and MU-MIMO transmission interval 304. Finally, the ACK may set its network allocation vector (NAV) to reserve the time until the end of the following MU-MIMO transmission.

Figure 4:
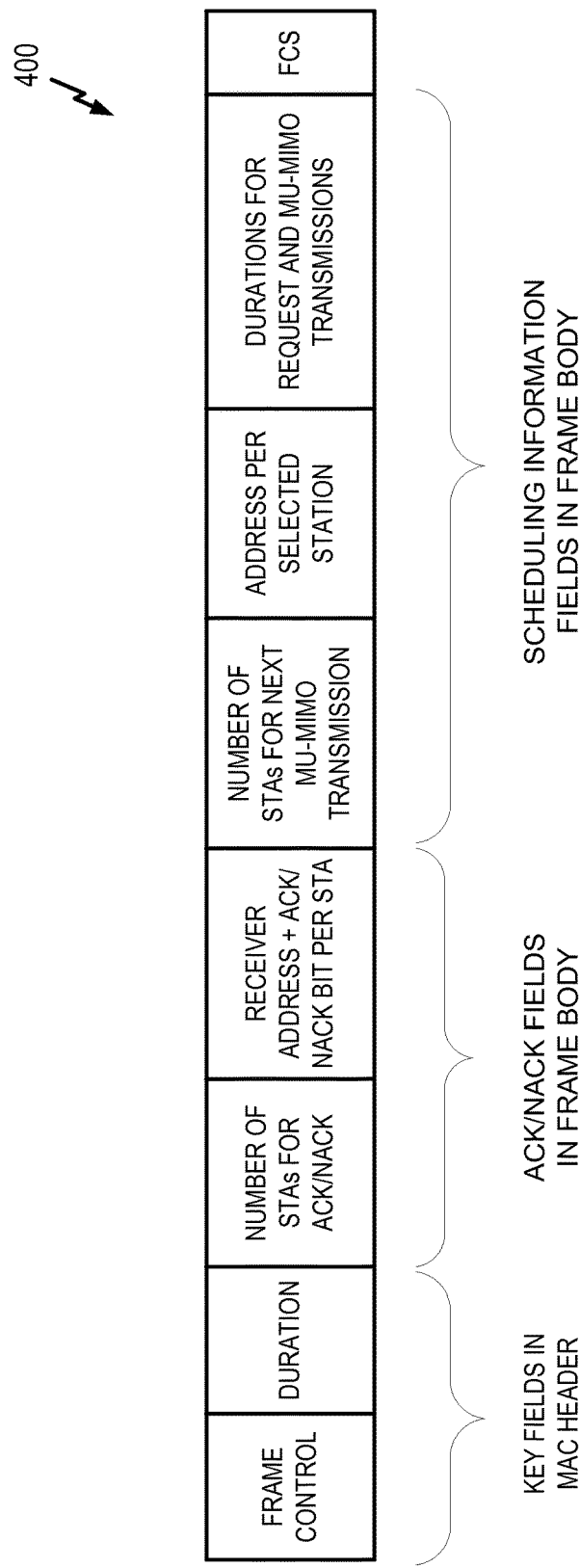
FIG. 4 illustrates an example of frame structure in accordance with some aspects of the disclosure.

FIG. 4 illustrates an example of an ACK frame structure 400 for 802.11 ACK aided MU-MIMO that may be used in accordance with the teachings herein. The frame structure is based on 802.11 frame structure, which includes a preamble, a physical layer convergence protocol header, and the following MAC protocol data unit. For simplicity, only the MAC protocol data unit portion is shown in FIG. 4.

A first portion of the frame is designated as key fields in the MAC header. The key fields may include frame control, duration, and broadcast address (not shown).

The frame control (FC) has a control field set to 01 and a subtype field as any number in 0000-0110 (not used). The FC is used to indicate that this is a special ACK with scheduling information for MU-MIMO.

The duration (NAV) consists of the ACK frame duration, the following request transmission duration, the following MU-MIMO transmission duration, and gaps in middle.

The broadcast address (not shown in FIG. 4) is used to indicate that the frame body only needs to be read by served MU-MIMO capable STAs, which are addressed by this broadcast address.

A second portion of the frame of FIG. 4 is designated as ACK/NACK fields in the frame body. These fields indicate the number of STAs to which the group ACK/NACK is directed. These fields are also used to indicate the address and the ACK/NACK bit per STA in the last MU-MIMO transmission.

A third portion of the frame of FIG. 4 is designated as scheduling information fields in the frame body. These fields indicate the number of STAs that are scheduled to transmit during the next MU-MIMO transmission.

The scheduling information fields may be used to indicate selected STA addresses. The selected STAs also may transmit pilots at the beginning of next MU-MIMO transmission period according to the indicated address order.

The scheduling information fields also may be used to indicate the following request transmission duration and the MU-MIMO transmission duration. An AP can indicate the end of the UL MU-MIMO session by setting both durations as 0. If the session ends, STAs and the AP can contend for the channel based on carrier sense multiple access (CSMA). In addition, the scheduling information fields may be used to optionally specify the following request transmission start time and/or the MU-MIMO transmission start time (not shown in FIG. 4).

The scheduling information fields also may be used to optionally specify the modulation and coding scheme (MCS) per STA (not shown in FIG. 4). The MCS may be based, for example, on one or more of: received request received signal strength indication (RSSI), the number of received requests, or previous decoding results (not shown in FIG. 4). If an AP does not specify the MCS, a STA can choose its MCS based on, for example, the AP's beacon RSSI as well as previous decoding results.

The scheduling information fields also may be used to optionally specify STA pilot transmission order in the MU-MIMO transmission interval (not shown in FIG. 4). If the AP does not specify this order, a STA can choose the order based on, for example, the selected STA address order.

FIGS. 5-9 illustrate an example of a procedure for an ACK aided UL MIMO session. As shown in FIGS. 5-9, the session has an initiating phase in cycle 1, undergoing phases in cycles 2-4, and an ending phase in cycle 5.

Figure 5:
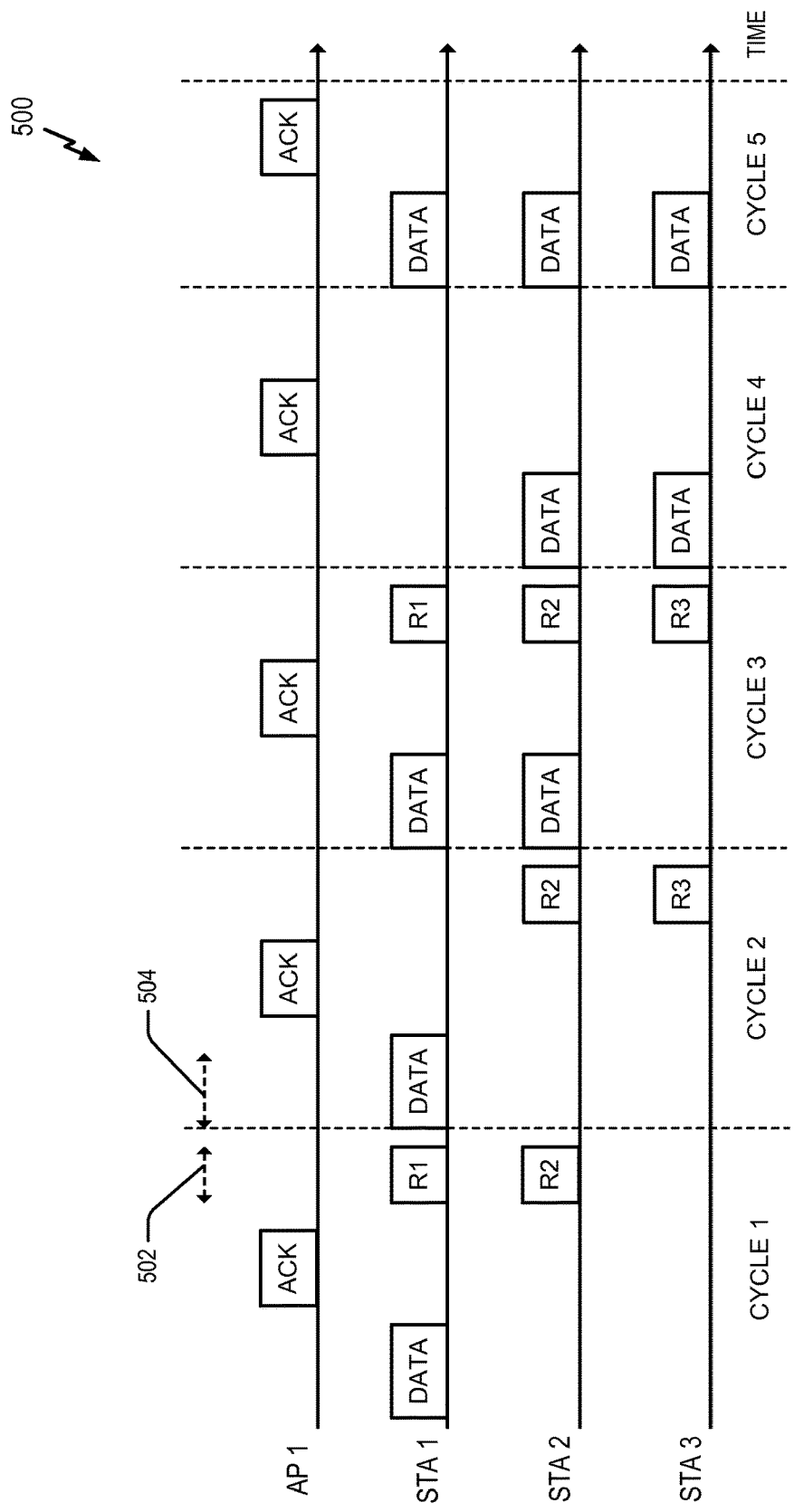
FIG. 5 illustrates an example of an initiating phase of an UL MU-MIMO session in accordance with some aspects of the disclosure.

Referring initially to the session 500 of FIG. 5, cycle 1 is an initiating phase. Here, an AP acknowledges STA 1's data by sending the ACK with the additional functions (e.g., including scheduling information) as described herein. The ACK may indicate the durations of the following request transmission interval 502 and MU-MIMO transmission interval 504 shown in FIG. 5. STAs with data to send will send requests in the indicated request transmission interval, and STAs selected by ACK will transmit in the indicated MU-MIMO transmission interval. If STA 1 indicates "more data" in its data sent in cycle 1, the ACK may indicate that STA 1 is selected for transmission in cycle 2. Otherwise, the AP may send a special CTS (not shown in FIG. 5) instead of the ACK in cycle 2 to carry scheduling information. The ACK may set its NAV to reserve the time until the end of the following MU-MIMO transmission in cycle 2.

Figure 6:
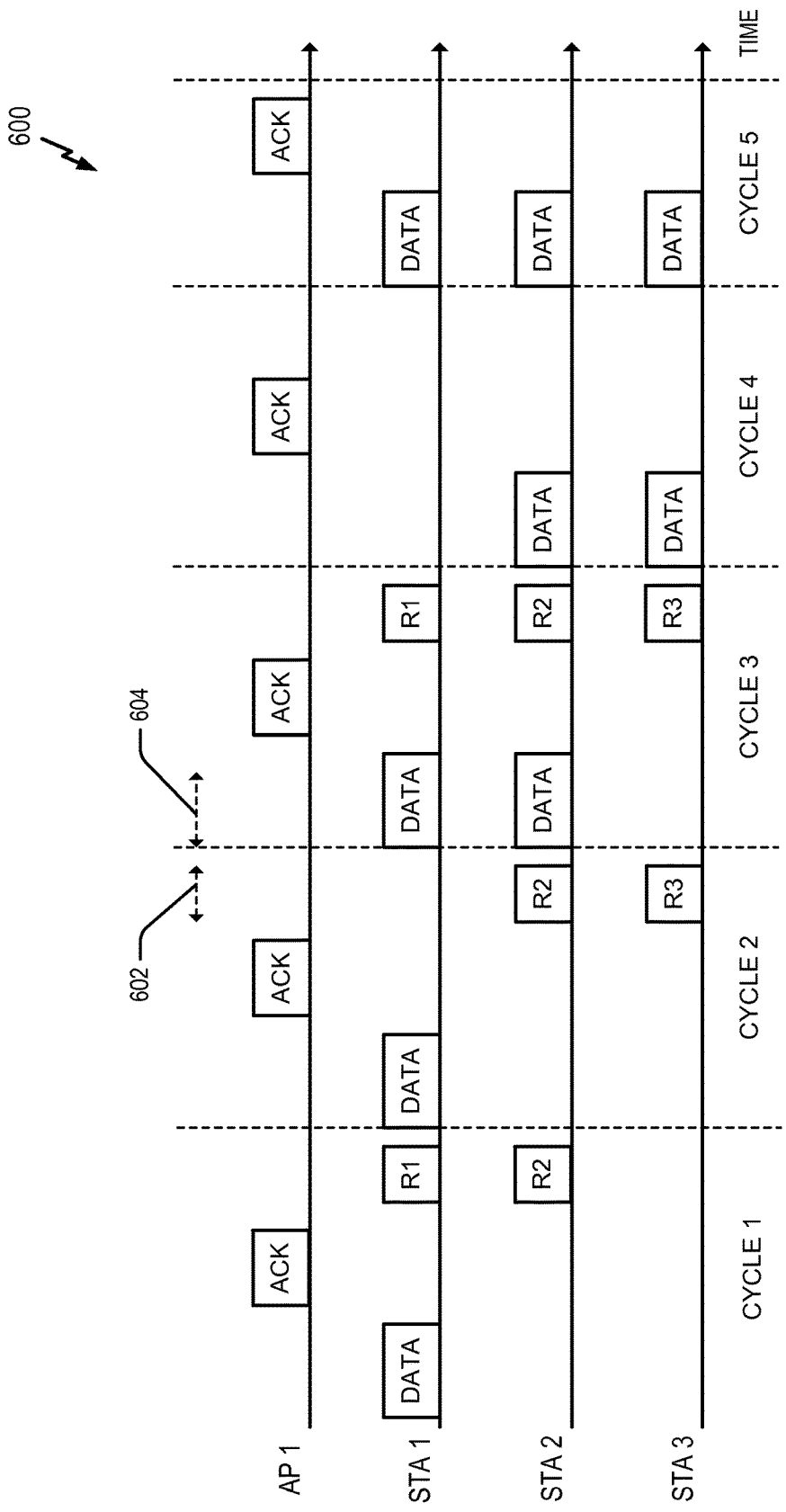
FIG. 6 illustrates an example of an undergoing phase of an UL MU-MIMO session in accordance with some aspects of the disclosure.

Referring now to the session 600 of FIG. 6, cycle 2 is an undergoing phase. Here, the AP acknowledges STA 1's data by sending the ACK with additional functions as described herein. The ACK may indicate the durations of the following request transmission interval 602 and MU-MIMO transmission interval 604 as shown in FIG. 6. The ACK may indicate that STA 1 and STA 2 are selected for transmission in cycle 3 (since STA 1 and STA 2 sent requests in cycle 1). The ACK may set its NAV to reserve the time until the end of the MU-MIMO transmission in cycle 3.

Figure 7:
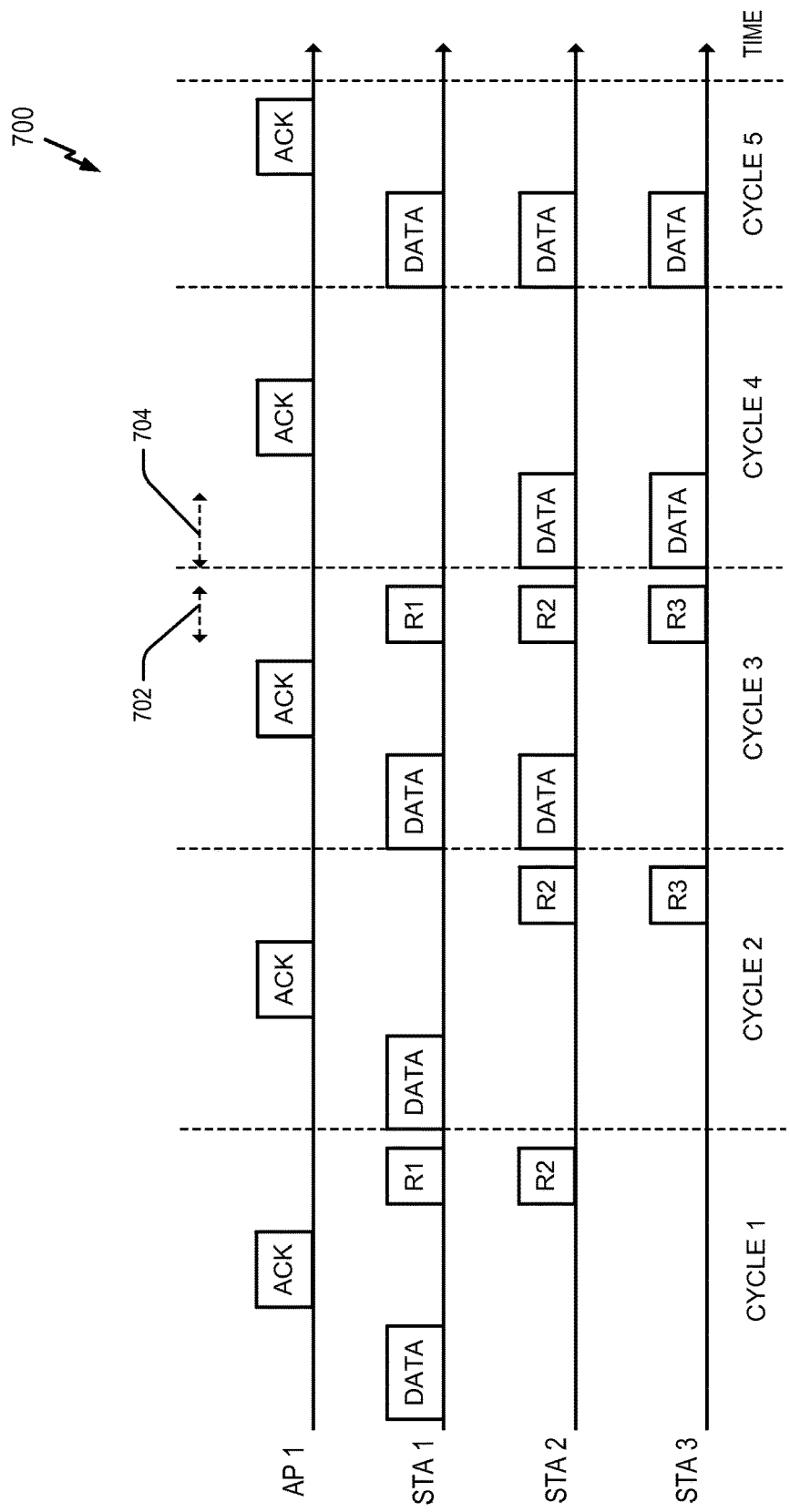
FIG. 7 illustrates an example of another undergoing phase of an UL MU-MIMO session in accordance with some aspects of the disclosure.

Referring to the session 700 of FIG. 7, cycle 3 is another undergoing phase. Here, the AP acknowledges STA 1's data and STA 2's data by sending the ACK (A) with additional functions as described herein. The ACK may indicate the durations of the following request transmission interval 702 and MU-MIMO transmission interval 704 as shown in FIG. 7. The ACK may indicate that STA 2 and STA 3 are selected for transmission in cycle 4 (since STA 2 and STA 3 sent requests in cycle 2). The ACK may set its NAV to reserve the time until the end of the MU-MIMO transmission in cycle 4.

Figure 8:
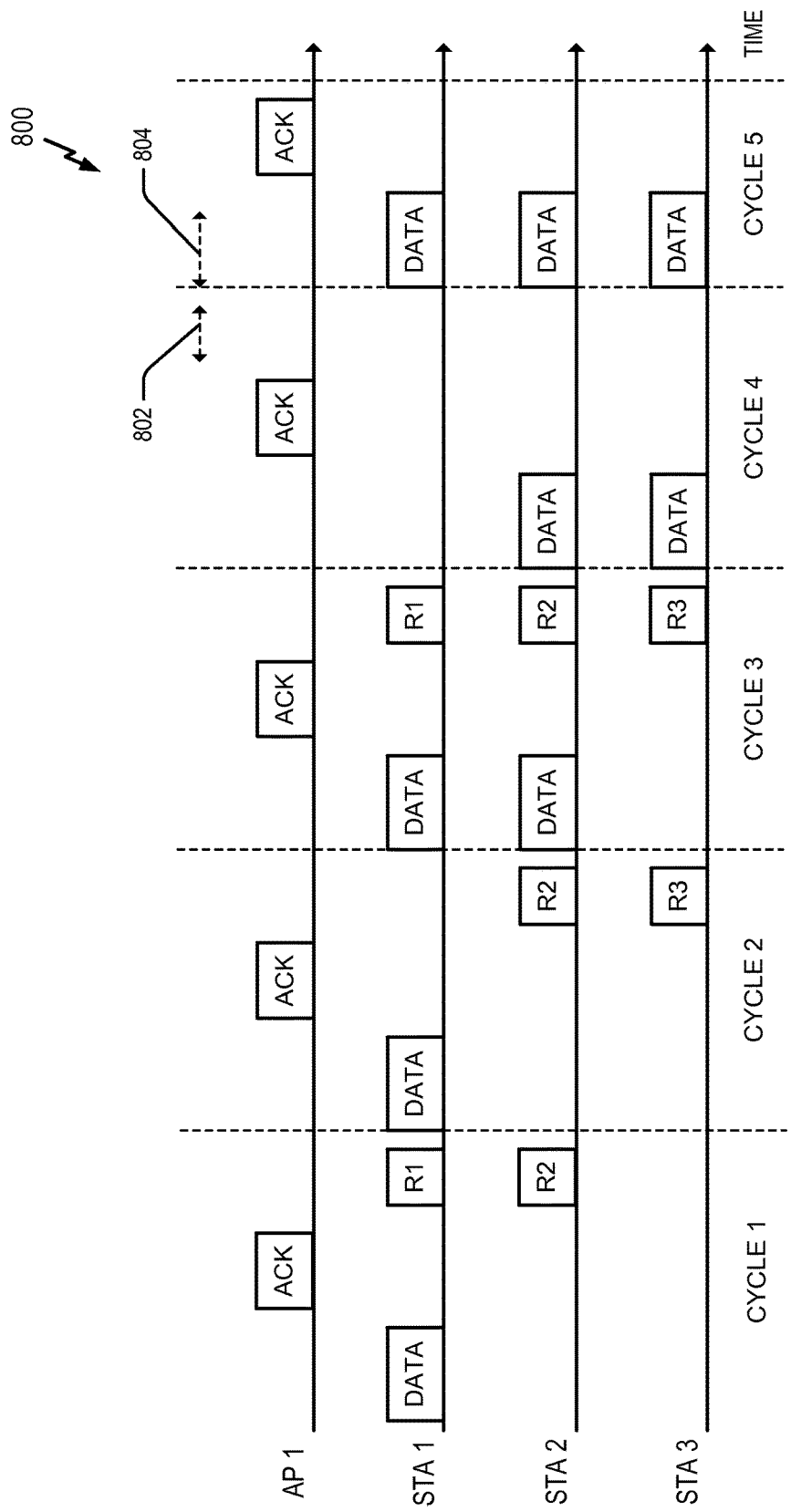
FIG. 8 illustrates an example of another undergoing phase of an UL MU-MIMO session in accordance with some aspects of the disclosure.

Referring to the session 800 of FIG. 8, cycle 4 is also an undergoing phase. Here, the AP acknowledges STA 2's data and STA 3's data by sending the ACK with additional functions as described herein. The ACK may indicate the durations of the following request transmission interval 802 and MU-MIMO transmission interval 804 as shown in FIG. 8. The ACK may indicate that STA 1, STA 2, and STA 3 are selected for transmission in cycle 5 (since they all sent requests in cycle 3). The ACK may set its NAV to reserve the time until the end of the MU-MIMO transmission in cycle 5.

Figure 9:
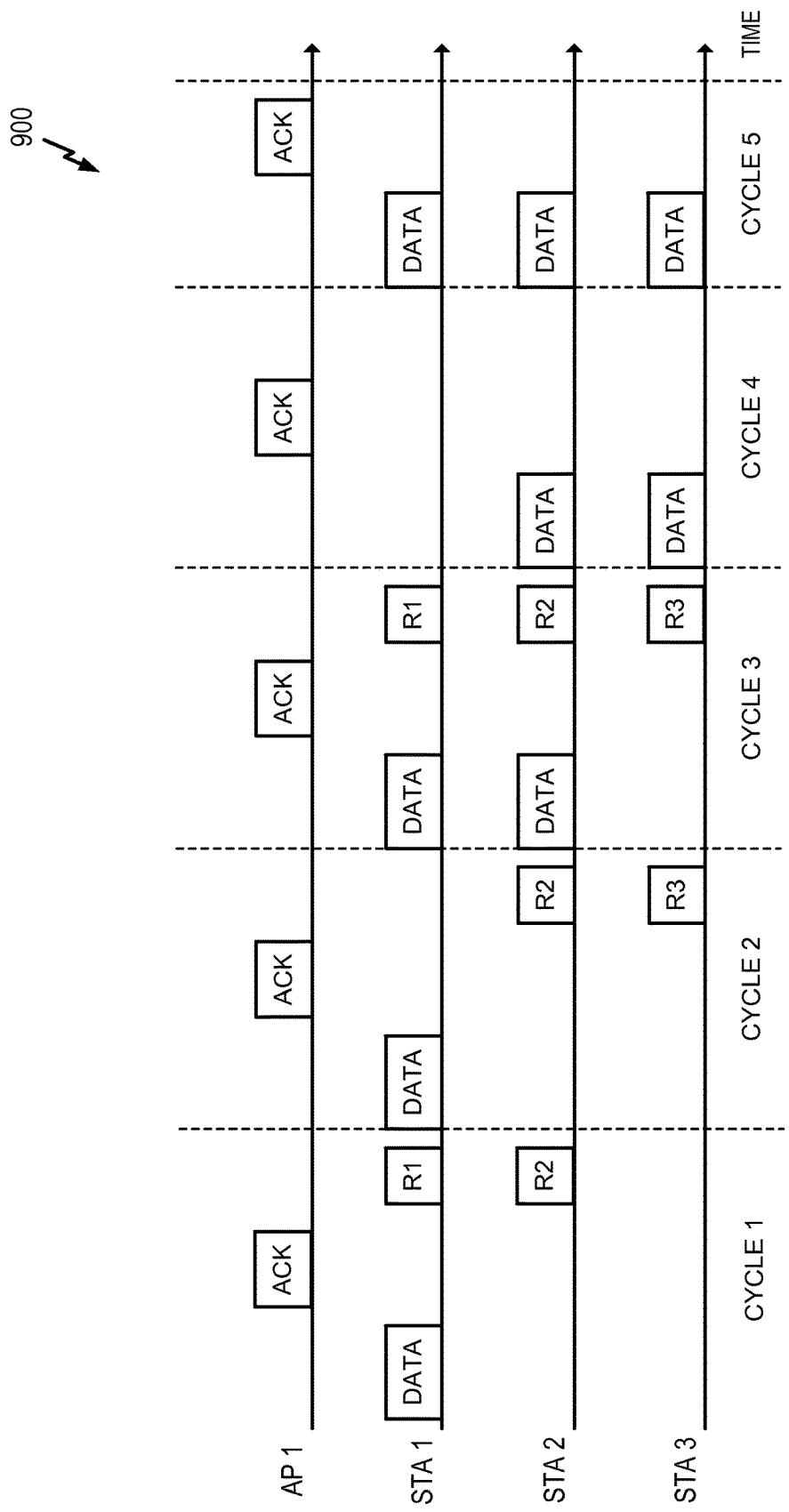
FIG. 9 illustrates an example of an ending phase of an UL MU-MIMO session in accordance with some aspects of the disclosure.

Referring to the session 900 of FIG. 9, cycle 5 is an ending phase. Here, the AP acknowledges STA 1's data, STA 2's data, and STA 3's data by sending the ACK with additional functions as described herein. The ACK may indicate zero duration of the following request transmission interval and MU-MIMO transmission interval (because no STA has indicated having data by sending a request in cycle 4). The AP can also end the MU-MIMO session if a maximum session duration is reached. The ACK may indicate that no STA is selected for following MU-MIMO transmission. The ACK may set NAV to only cover itself, so that STAs and the AP can contend for the channel in CSMA after this ACK.

Several additional considerations that may be taken into account for UL MU-MIMO follow.

STAs may employ various methods to send requests in a request transmission interval. For example, STAs can contend to send requests based on CSMA within the request transmission interval. As another example, STAs can send requests in orthogonal channels (e.g., using OFDMA or CDMA).

An AP may employ various methods to select STAs for MU-MIMO transmission. For example, an AP can select the first M strongest STAs based on RSSI of received requests, where M is the maximum of the number of streams (assuming one stream per selected STA).

The determination of the MU-MIMO interval duration may be made in various ways. For example, the duration can be selected to correspond to a typical frame length (e.g., 1500 Bytes) at the lowest rate, so that a STA can send at least one frame at the lowest rate.

The STA pilot transmission order may be specified in various ways. For example, at the beginning of the MU-MIMO transmission interval, selected STAs may transmit pilot signals in TDMA according to the address order indicated in the ACK. After the pilot session, the selected STAs may send data frames in parallel.

Figure 10:
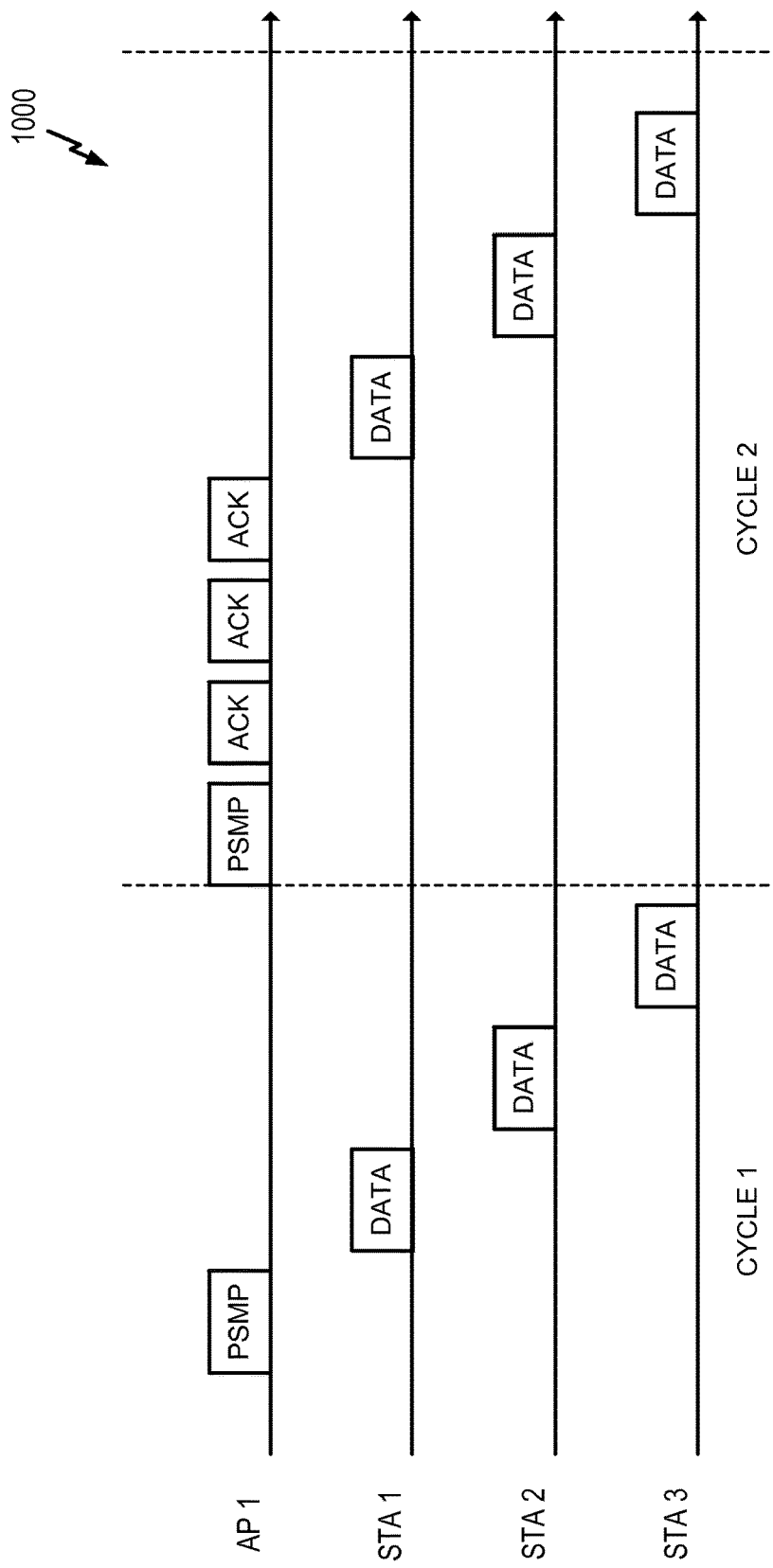
FIG. 10 illustrates an example of a conventional scheduled transmission.
Figure 11:
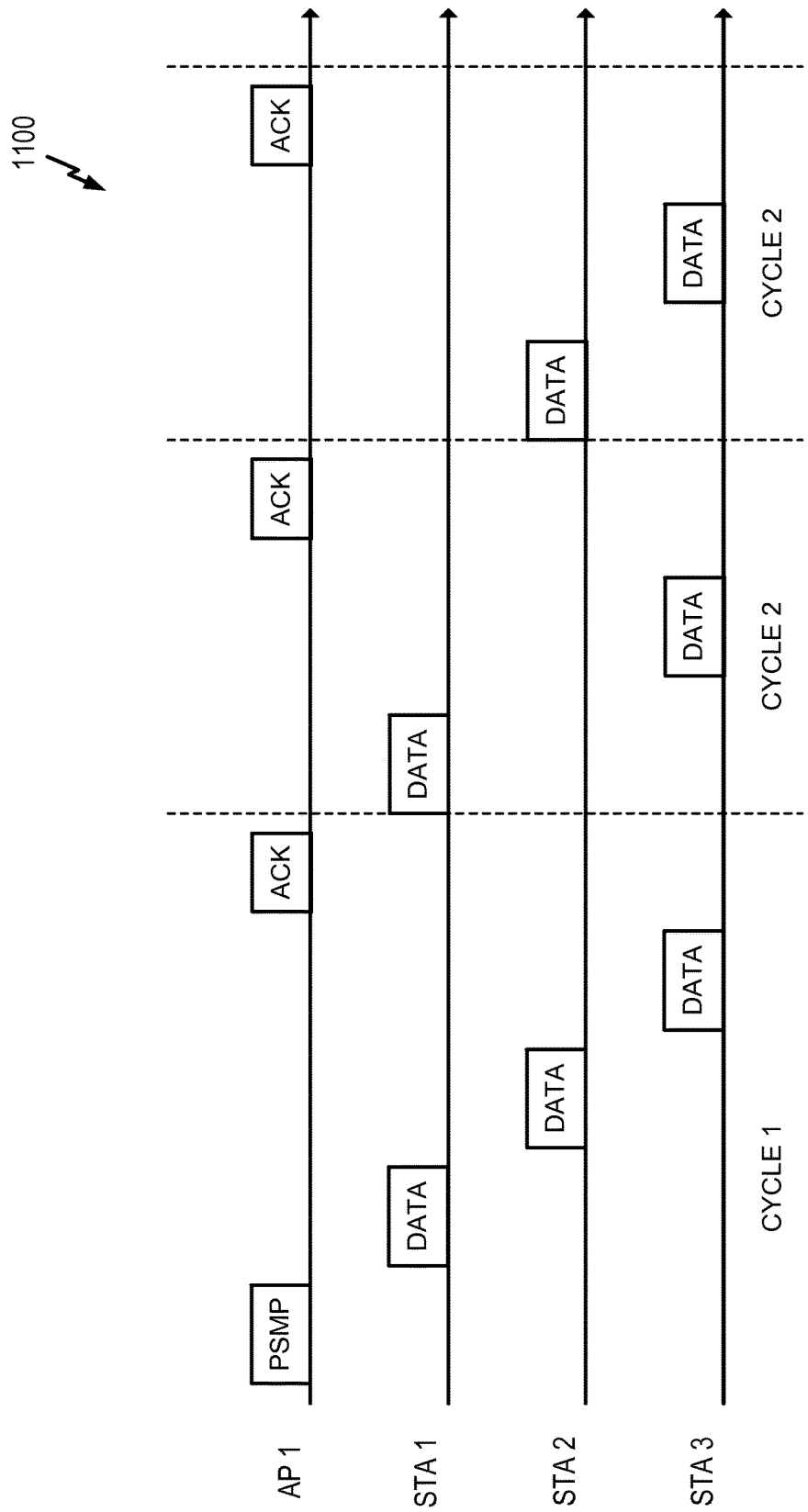
FIG. 11 illustrates an example of an UL scheduled transmission in accordance with some aspects of the disclosure.
Figure 12:
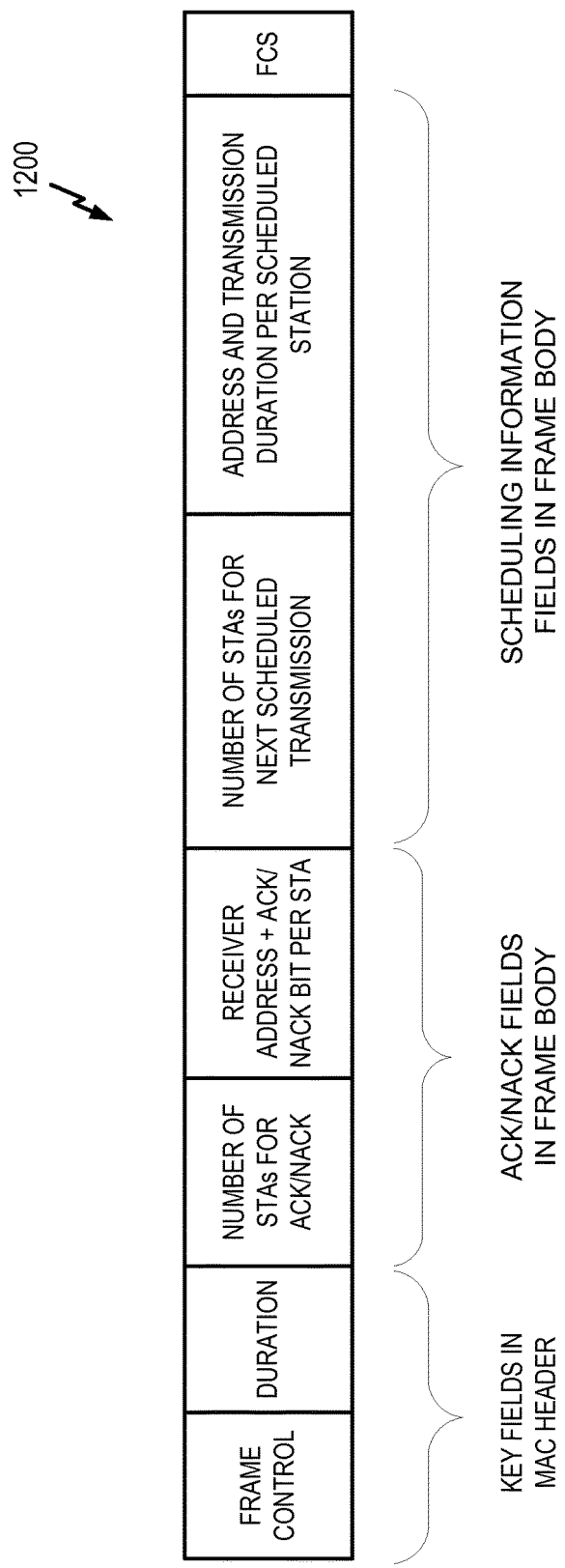
FIG. 12 illustrates an example of frame structure in accordance with some aspects of the disclosure.

Referring now to FIGS. 10-12, as mentioned above, the disclosure also relates in some aspects to overhead reduction for an UL time domain scheduled transmission. Similar to the above, an acknowledgement frame may include scheduling information for a scheduled transmission.

In conventional Power Save Multiple Poll (PSMP) schemes, schedule information and ACK information are sent in different frames as shown, for example, in the session 1000 of FIG. 10. In case of UL only traffic, scheduled information for the following UL scheduled transmission is sent in each PSMP frame, which is followed by ACK frames to indicate the previous UL data transmission result per STA.

FIG. 11 illustrates an example of an ACK aided UL scheduled transmission session 1100 (e.g., PSMP) in accordance with the teachings herein. Initially, a PSMP frame sends an UL transmission schedule, based on which scheduled STAs sequentially send UL data without a contention gap in the middle. An ACK may then provide pass/fail result per STA.

The ACK also may provide scheduling information for following scheduled transmission (e.g., the data transmission in cycle 2). For example, the ACK may indicate scheduled STAs, their transmission order, transmission start time, and the transmission duration per STA in the next scheduled transmission cycle. Scheduled STAs can be those indicating "more data" in the last cycle. UL scheduled transmission cycles may end if no STA indicates "more data" or if a maximum session duration is reached.

FIG. 12 illustrates an example of an ACK frame structure 1200 for ACK aided UL time domain scheduled transmission, UL TDST (e.g., PSMP), that may be used in accordance with the teachings herein. The frame structure is based on 802.11 frame structure, which includes a preamble, a physical layer convergence protocol header, and the following MAC protocol data unit. For simplicity, only the MAC protocol data unit portion is shown in FIG. 12.

A first portion of the frame is designated as key fields in the MAC header. The key fields may include frame control, duration, and broadcast address (not shown).

The frame control (FC) has a control field set to 01 and a subtype field as any number in 0000-0110 (not used). The FC is used to indicate that this is a special ACK with scheduling information for UL scheduled transmission.

The duration (NAV) consists of the ACK frame duration, the UL scheduled transmission duration, and gaps in middle.

The broadcast address (not shown in FIG. 12) is used to indicate that the frame body only needs to be read by served UL scheduled transmission capable STAs, which are addressed by this broadcast address.

A second portion of the frame of FIG. 12 is designated as ACK/NACK fields in the frame body. These fields indicate the number of STAs to which the group ACK/NACK is directed. These fields are used to indicate the address and the ACK/NACK bit per STA in the last UL scheduled transmission.

A third portion of the frame of FIG. 12 is designated as scheduling information fields in the frame body. These fields indicate the number of STAs that are scheduled to transmit during the next scheduled transmission.

The scheduling information fields may be used to indicate selected STA addresses. The selected STAs can be those indicating "more data" in the last scheduled transmission. No selected STA implies the end of the UL scheduled transmission session. If the session ends, STAs and the AP can contend for the channel based on CSMA.

The scheduling information fields may be used to indicate the transmission duration per scheduled STA. In addition, the scheduling information fields may be optionally used to indicate the transmission start time per scheduled STA.

Instead of scheduling STAs in time domain (UL TDST), they can be scheduled in frequency domain (e.g., uplink orthogonal frequency division multiple access (UL OFDMA)) and, more generally, in both frequency and time domains (e.g., uplink time frequency scheduled transmission (UL TFST)). In those cases, the scheduling information fields may be used to indicate the allocated time-frequency resource per scheduled STA. Specifically, the scheduling information fields may be used to indicate the allocated frequency tones and/or time period for each scheduled STA in each UL transmission cycle.

The scheduling information fields also may be used to optionally specify the MCS per STA. The MCS may be based, for example, on one or more of: received data packet RSSI, or previous decoding results (not shown in FIG. 12). If an AP does not specify the MCS, a STA can choose its MCS based on, for example, the AP's beacon RSSI as well as previous decoding results.

The scheduling information fields also may be used to optionally specify STA transmission order in the next UL scheduled transmission interval (not shown in FIG. 12). If the AP does not specify this order, a STA can choose the order based on, for example, the selected STA address order.

With the above in mind, examples of operations that may be performed in accordance with the teachings herein will be described in more detail with reference to FIGS. 13-16. For purposes of illustration, these operations may be described as being performed by a specific apparatus. It should be appreciated, however, that these operations may be performed by different types of apparatuses in different implementations.

Figure 13:
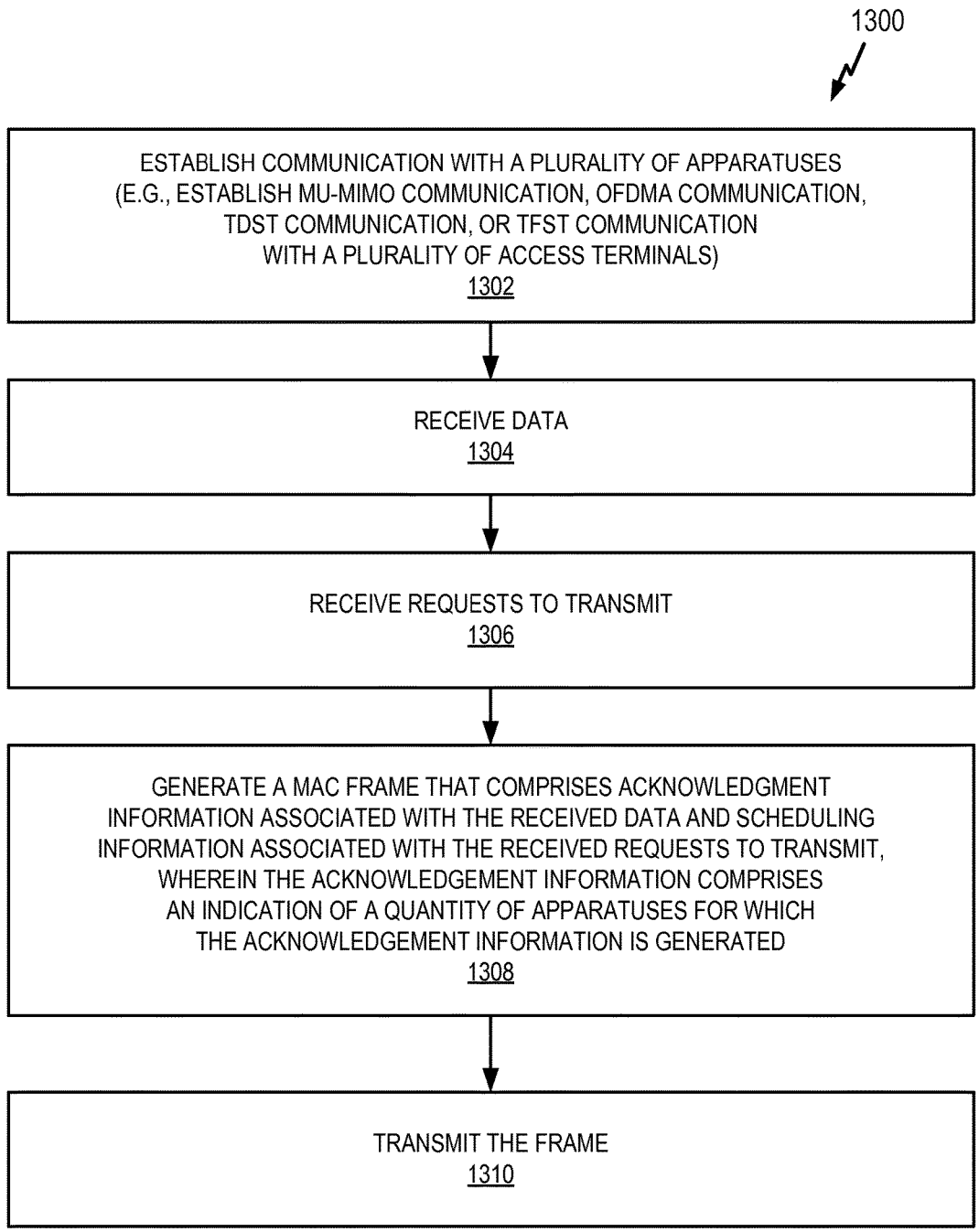
FIG. 13 is a flowchart illustrating several sample aspects of operations relating to an example of generating and transmitting a frame in accordance with some aspects of the disclosure.

Referring initially to FIG. 13, in some aspects, this flowchart describes sample operations that may be performed by a first apparatus in conjunction with generating and transmitting a frame comprising acknowledgement and scheduling related information. In some implementations, the first apparatus may embody (e.g., include, be implemented as, be implemented in, etc.) an access point or some other suitable type of node (e.g., a relay), while the other apparatuses may comprise access terminals or some other suitable type of nodes.

As represented by block 1302, communication is established with a plurality of apparatuses. For example, an access point may establish UL MU-MIMO communication with a plurality of served apparatuses. As another example, an access point may establish UL OFDMA communication with a plurality of served apparatuses. As another example, an access point may establish UL TDST communication with a plurality of served apparatuses. As yet another example, an access point may establish UL TFST communication with a plurality of served apparatuses. In some implementations, the plurality of apparatuses comprises a plurality of access terminals (e.g., STAs).

As represented by block 1304, data is received. For example, an access point may receive data from one or more of its served access terminals.

As represented by block 1306, requests to transmit are received. For example, an access point may receive requests to transmit from one or more of its served access terminals.

As represented by block 1308, a MAC frame is generated. The MAC frame comprises acknowledgment information associated with the data received at block 1304 and scheduling information associated with the requests to transmit received at block 1306. In addition, the acknowledgement information comprises an indication of a quantity of apparatuses for which the acknowledgement information is generated.

To this end, in response to the received data, a determination is made as to whether the data is received successfully. For example, CRC or some other suitable check may be performed on the data received from a given apparatus to determine whether the data has been successfully received. If the data was received successfully, a positive ACK indication for the corresponding apparatus may be included in the acknowledgment information. If the data was not received successfully, a negative ACK (NACK) indication for the corresponding apparatus may be included in the acknowledgment information.

In addition, in response to the received requests to transmit, data transmissions are scheduled according to the communication established at block 1302. For example, if MU-MIMO communication is established at block 1302, MU-MIMO transmissions are scheduled in response to the requests to transmit. Similarly, if OFDMA communication is established at block 1302, OFDMA transmissions are scheduled in response to the requests to transmit. Also, if TDST communication is established at block 1302, TDST transmissions are scheduled in response to the requests to transmit. In addition, if TFST communication is established at block 1302, TFST transmissions are scheduled in response to the requests to transmit.

The acknowledgment information may take various forms in different implementations. In some aspects, the acknowledgement information indicates, for each of the apparatuses, whether data was successfully received from the apparatus. In some aspects, the acknowledgement information indicates, for each of the apparatuses, the address of the apparatus.

The scheduling information may take various forms in different implementations. In some aspects, the scheduling information may indicate an order to be used for pilot transmissions.

In some aspects, the scheduling information may indicate an order to be used for data transmissions.

In some aspects, the scheduling information may indicate a start time and a duration for transmission of subsequent requests to transmit.

In some aspects, the scheduling information may indicate a start time and a duration for at least one scheduled data transmission.

In some aspects, the scheduling information may identify a plurality of apparatuses that are scheduled to transmit data. In this case, the scheduling information may indicate, for each of the identified apparatuses, a start time and a duration for the scheduled data transmission for the identified apparatus. In addition, the scheduling information may indicate, for each of the identified apparatuses, an allocated time-frequency resource for a scheduled data transmission for the identified apparatus. Also, the scheduling information may indicate, for each of the identified apparatuses, a transmission rate for a scheduled data transmission for the identified apparatus. Moreover, the scheduling information may indicate, for each of the identified apparatuses, a modulation and coding scheme for a scheduled data transmission for the identified apparatus.

As represented by block 1310, the frame is transmitted. For example, an access point may broadcast the MAC frame.

Figure 14:
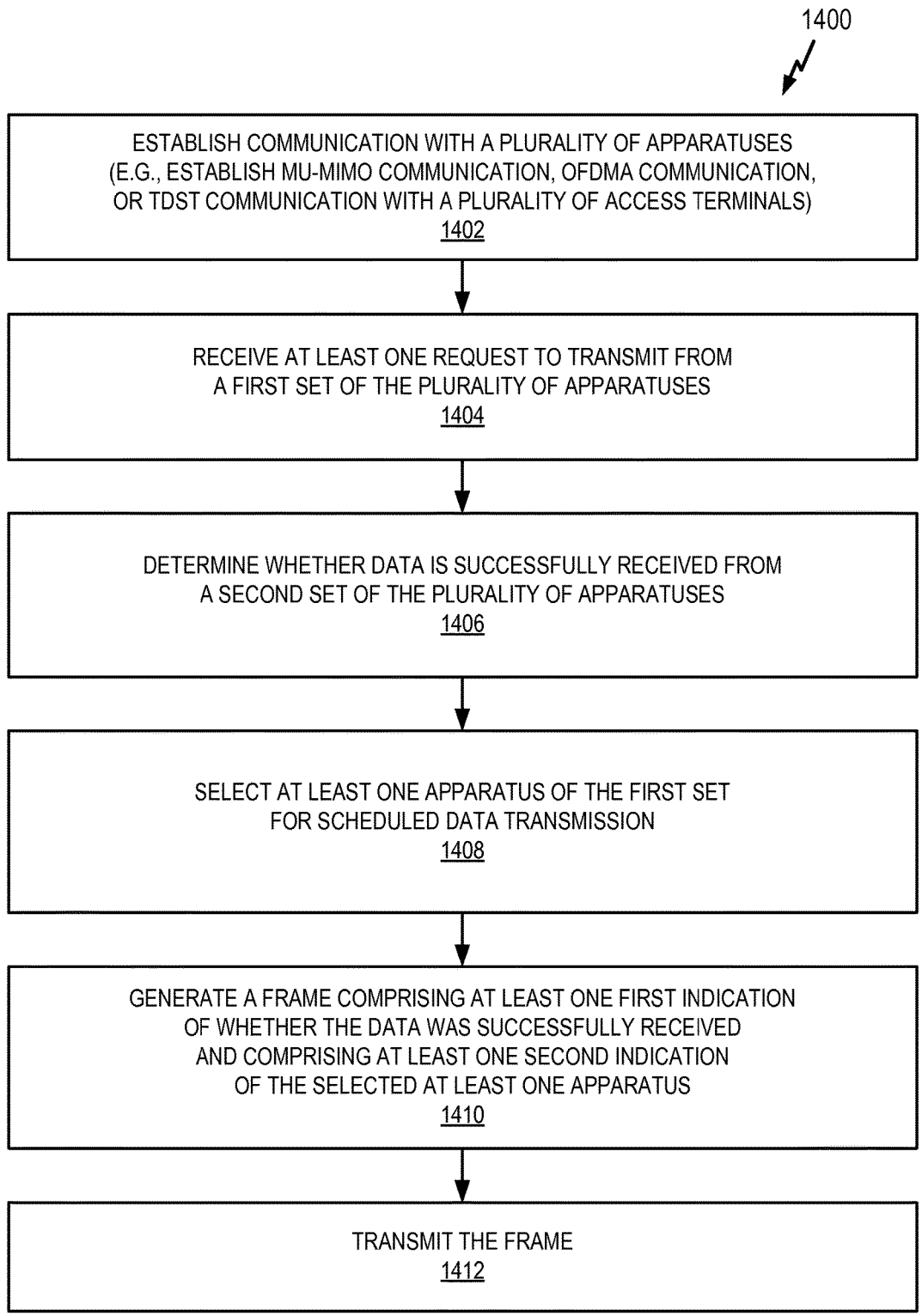
FIG. 14 is a flowchart illustrating several additional aspects of operations relating to an example of generating and transmitting a frame in accordance with some aspects of the disclosure.

Referring to FIG. 14, in some aspects, this flowchart describes sample operations that may be performed by a first apparatus in conjunction with generating and transmitting a frame comprising acknowledgement and scheduling related information. In some implementations, the first apparatus may embody (e.g., include, be implemented as, be implemented in, etc.) an access point or some other suitable type of node (e.g., a relay), while the other apparatuses may comprise access terminals or some other suitable type of nodes.

As represented by block 1402, communication (e.g., MU-MIMO communication, orthogonal-frequency-division-multiple-access (OFDMA) communication, time-domain-scheduled-transmission (TDST) communication, or time-frequency-scheduled-transmission (TFST) communication) is established with a plurality of apparatuses. For example, an access point may establish UL MU-MIMO communication with a plurality of served apparatuses. As another example, an access point may establish UL OFDMA communication with a plurality of served apparatuses. As another example, an access point may establish UL TDST communication with a plurality of served apparatuses. As yet another example, an access point may establish UL TFST communication with a plurality of served apparatuses. In some implementations, the plurality of apparatuses comprises a plurality of access terminals.

As represented by block 1404, at least one request to transmit is received from a first set of the plurality of apparatuses.

As represented by block 1406, a determination is made as to whether data is successfully received from a second set of the plurality of apparatuses. For example, the access point may monitor for data from a first access terminal and a second access terminal that were previously scheduled to transmit data.

The first and second sets may comprise the same element or elements in some cases and comprise different elements in other cases. For example, at block 1404, the access point may receive requests from the first and second access terminals, from the second access terminal and a third access terminal, from one of these access terminals, or from one or more other access terminals.

As represented by block 1408, at least one apparatus of the first set is selected for scheduled data transmission. For example, the access point may schedule the third access terminal to transmit data in a future data cycle.

As represented by block 1410, a frame is generated. This frame comprises at least one first indication of whether the data was successfully received, and also comprises at least one second indication of the selected at least one apparatus.

The frame may be generated to comprise (e.g., include) other indications. In some aspects, the frame may comprise at least one indication of a start time and/or a duration for transmission of subsequent requests to transmit. In some aspects, the frame may comprise at least one indication of a start time and/or a duration for the scheduled data transmission (e.g., for each of the selected at least one apparatus). In some aspects, the frame may comprise at least one indication of at least one transmission rate for the scheduled data transmission. In some aspects, the frame may comprise at least one indication of at least one modulation and coding scheme for the scheduled data transmission. In some aspects, the frame may comprise at least one indication of an order for transmitting pilot signals (e.g., in the case of UL MU-MIMO communication). In some aspects, the frame may comprise at least one indication of an allocated time-frequency resource for each of the selected at least one apparatus (e.g., in the case of UL OFDMA communication).

In some implementations, the at least one apparatus selected at block 1408 comprises a plurality of selected apparatuses (e.g., the second and third access terminals). In this case, the frame may be generated at block 1410 to comprise (e.g., include) at least one indication of a transmission order for transmissions by the plurality of selected apparatuses (e.g., in the case of UL TDST communication).

As represented by block 1412, the frame generated at block 1410 is transmitted.

In some implementations, the above operations are implemented in multiple cycles. For example, the monitoring and receiving may be performed during a first data transfer cycle, the transmission of the frame may be performed during a second data transfer cycle (e.g., that immediately follows the first data transfer cycle), and the scheduled data transmission (for which the at least one apparatus is selected) may be for a third data transfer cycle (e.g., that immediately follows the second data transfer cycle).

Figure 15:
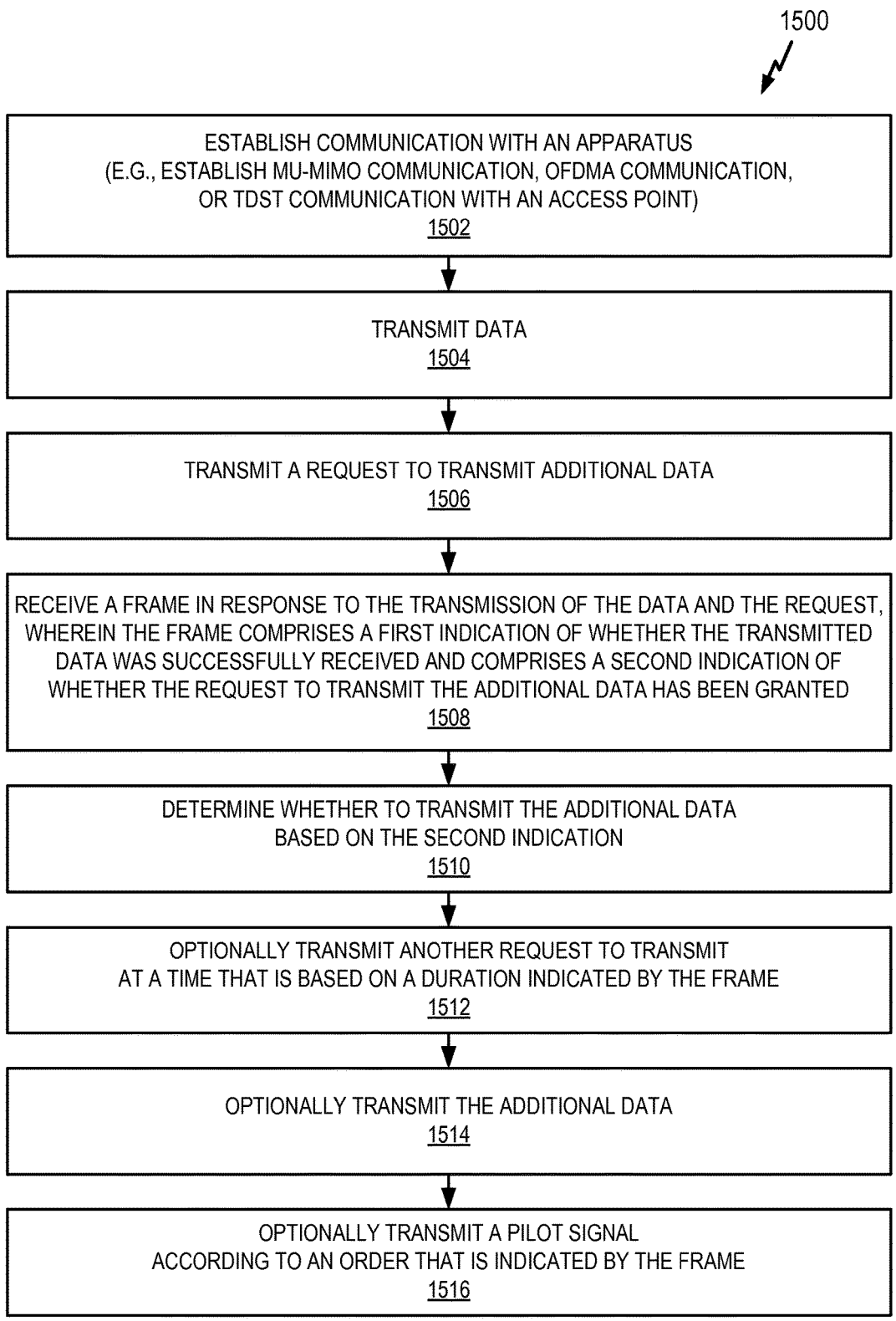
FIG. 15 is a flowchart illustrating several sample aspects of operations relating to an example of receiving a frame and taking action based on receipt of the frame in accordance with some aspects of the disclosure.

Referring now to FIG. 15, in some aspects, this flowchart describes sample operations that may be performed by a first apparatus in conjunction with receiving a frame comprising acknowledgement and scheduling related information and taking action as a result of receiving the frame. In some implementations, the first apparatus may embody (e.g., include, be implemented as, be implemented in, etc.) an access terminal or some other suitable type of node.

As represented by block 1502, communication (e.g., MU-MIMO communication, orthogonal-frequency-division-multiple-access (OFDMA) communication, time-domain-scheduled-transmission (TDST) communication, or time-frequency-scheduled-transmission (TFST) communication) is established with an apparatus. For example, an access terminal may establish UL MU-MIMO communication with a serving access point. As another example, an access terminal may establish UL OFDMA communication with a serving access point. As another example, an access terminal may establish UL TDST communication with a serving access point. As yet another example, an access terminal may establish UL TFST communication with a serving access point.

As represented by block 1504, data is transmitted. For example, the access terminal may transmit data to its serving access point (e.g., in response to a previous scheduling operation).

As represented by block 1506, a request to transmit additional data is also transmitted. For example, the access terminal may have more data queued for transmission to the serving access point.

As represented by block 1508, a frame is received in response to the transmission of the data and the request. This frame comprises a first indication of whether the transmitted data was successfully received (e.g., by the serving access point), and comprises a second indication of whether the request to transmit the additional data has been granted (e.g., by the serving access point).

As represented by block 1510, a determination is made, based on the second indication, as to whether to transmit the additional data.

As represented by optional block 1512, the frame may comprise at least one indication of a start time and/or a duration for transmission of subsequent requests to transmit. In this case, another request to transmit may be transmitted at a time that is based on the duration.

As represented by optional block 1514, the additional data may be transmitted depending on the result of the determination of block 1510.

In some cases, the frame also comprises at least one indication of a start time and/or a duration for the transmission of the additional data. In such cases, the additional data may be transmitted according to the start time and/or duration (e.g., at a time that is based on the start time and/or duration).

In some cases, the frame also comprises at least one indication of a transmission order for transmissions by a plurality of apparatuses (e.g., a plurality of access terminals). In such cases, the additional data may be transmitted according to the transmission order. Such an indication may be used, for example, in the case of UL TDST communication.

In some cases, the frame also comprises at least one indication of a transmission rate for the transmission of the additional data. In such cases, the additional data may be transmitted according to the transmission rate.

In some cases, the frame also comprises at least one indication of a modulation and coding scheme for the transmission of the additional data. In such cases, the additional data may be transmitted according to the modulation and coding scheme.

In some cases, the frame also comprises at least one indication of an allocated time-frequency resource for the transmission of the additional data. In such cases, the additional data may be transmitted according to the allocated time-frequency resource. Such an indication may be used, for example, in the case of UL OFDMA communication.

As represented by optional block 1516, the frame may comprise at least one indication of an order for transmitting pilot signals. In this case, pilot signals may be transmitted according to the order. Such an indication may be used, for example, in the case of UL MU-MIMO communication.

In some implementations, the above operations are implemented in multiple cycles. For example, the transmissions of the data and the request may be performed during a first data transfer cycle, the frame may be received during a second data transfer cycle (e.g., that immediately follows the first data transfer cycle), and the request to transmit the additional data may be for a potential data transmission that would occur during a third data transfer cycle (e.g., that immediately follows the second data transfer cycle).

The teachings herein may be implemented using various wireless technologies. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, a combination of OFDM and DSSS communication, or other schemes.

Certain of the devices described herein may further implement Multiple Input Multiple Output (MIMO) technology and be implemented as part of an 802.11 protocol. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 16:
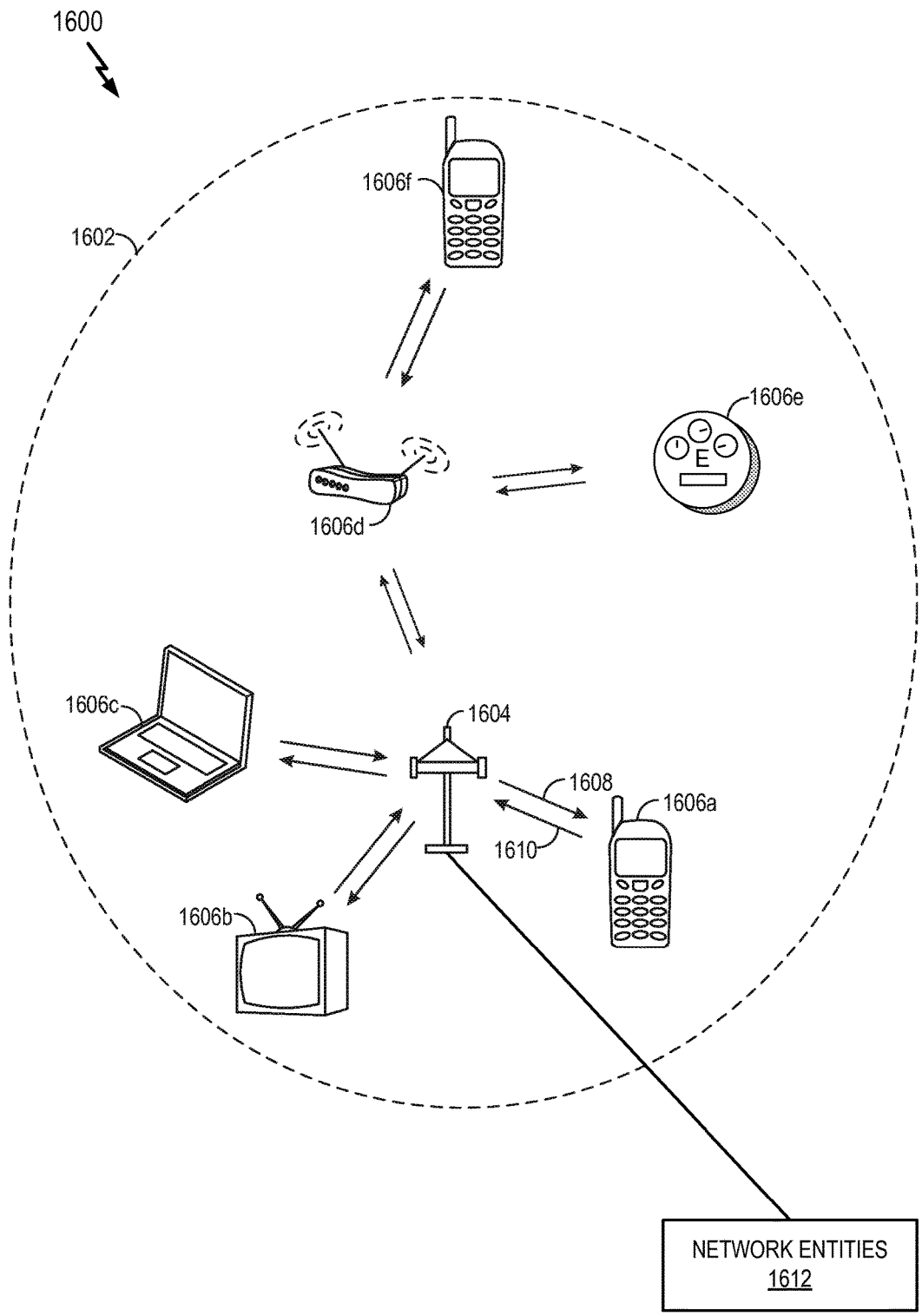
FIG. 16 illustrates an example of a network environment in which one or more aspects of the disclosure may find application.

FIG. 16 illustrates an example of a wireless communication system 1600 in which aspects of the present disclosure may be employed. The wireless communication system 1600 may operate pursuant to a wireless standard, for example the 802.11 standard. The wireless communication system 1600 may include an AP 1604, which communicates with STAs 1606a, 1606b, 1606c, 1606d, 1606e, and 1606f (collectively STAs 1606).

STAs 1606e and 1606f may have difficulty communicating with the AP 1604 or may be out of range and unable to communicate with the AP 1604. As such, another STA 1606d may be configured as a relay device (e.g., a device comprising STA and AP functionality) that relays communication between the AP 1604 and the STAs 1606e and 1606f.

A variety of processes and methods may be used for transmissions in the wireless communication system 1600 between the AP 1604 and the STAs 1606. For example, signals may be sent and received between the AP 1604 and the STAs 1606 in accordance with OFDM/OFDMA techniques. If this is the case, the wireless communication system 1600 may be referred to as an OFDM/OFDMA system. Alternatively, signals may be sent and received between the AP 1604 and the STAs 1606 in accordance with CDMA techniques. If this is the case, the wireless communication system 1600 may be referred to as a CDMA system.

A communication link that facilitates transmission from the AP 1604 to one or more of the STAs 1606 may be referred to as a downlink (DL) 1608, and a communication link that facilitates transmission from one or more of the STAs 1606 to the AP 1604 may be referred to as an uplink (UL) 1610. Alternatively, a downlink 1608 may be referred to as a forward link or a forward channel, and an uplink 1610 may be referred to as a reverse link or a reverse channel.

The AP 1604 may act as a base station and provide wireless communication coverage in a basic service area (BSA) 1602. The AP 1604 along with the STAs 1606 associated with the AP 1604 and that use the AP 1604 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 1604 or to some other access point in the network (not shown).

Each of the access points may communicate with one or more network entities (represented, for convenience, by network entities 1612 in FIG. 16), including each other, to facilitate wide area network connectivity. A network entity may take various forms such as, for example, one or more radio and/or core network entities. Thus, in various implementations the network entities 1612 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 1600 may not have a central AP 1604, but rather may function as a peer-to-peer network between the STAs 1606. Accordingly, the functions of the AP 1604 described herein may alternatively be performed by one or more of the STAs 1606. Also, as mentioned above, a relay may incorporate at least some of the functionality of an AP and a STA.

Figure 17:
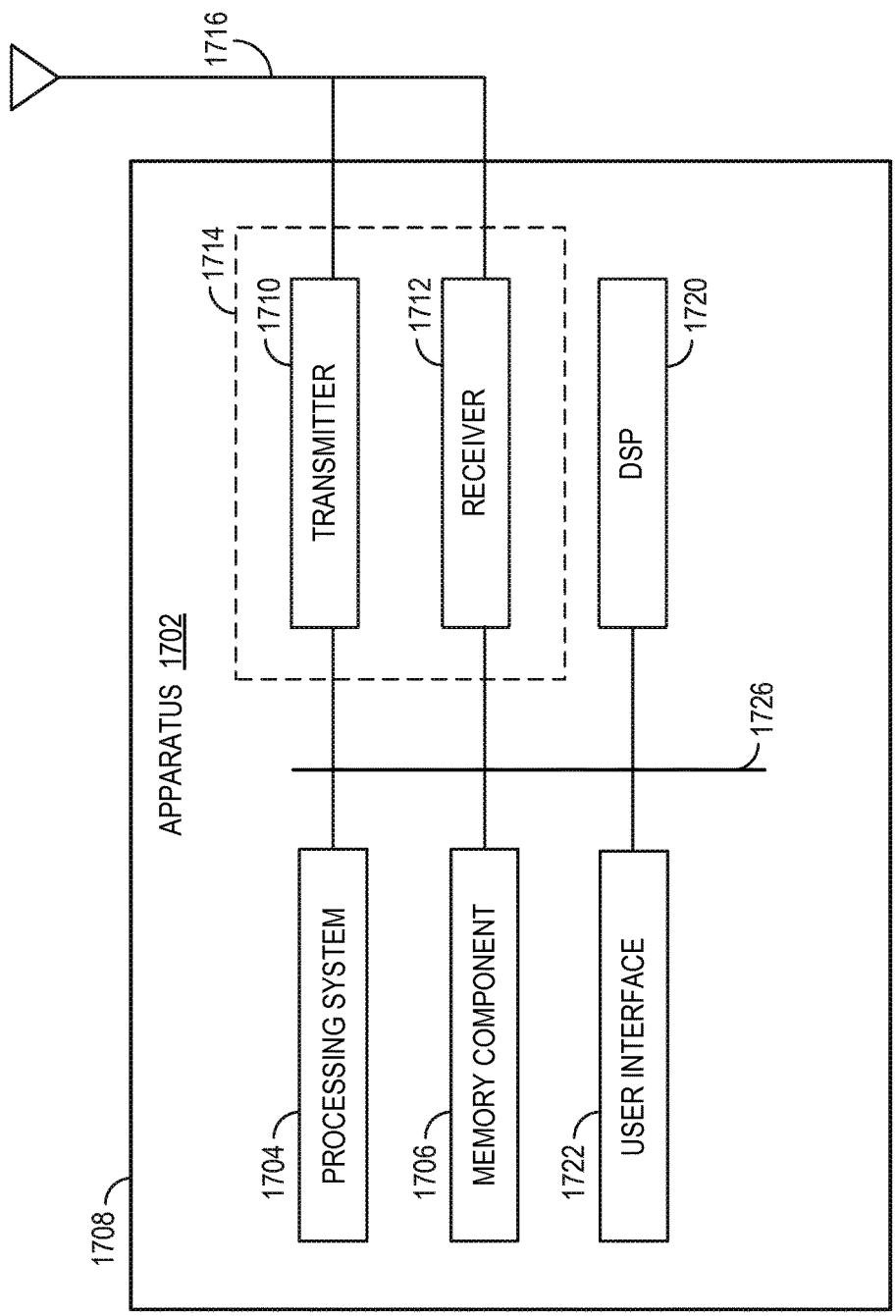
FIG. 17 is a functional block diagram illustrating an example of an apparatus that may be employed within a wireless communication system in accordance with some aspects of the disclosure.

FIG. 17 illustrates various components that may be utilized in an apparatus 1702 (e.g., a wireless device) that may be employed within the wireless communication system 1600. The apparatus 1702 is an example of a device that may be configured to implement the various methods described herein. For example, the apparatus 1702 may comprise the AP 1604, a relay 1606d, or one of the STAs 1606 of FIG. 16.

The apparatus 1702 may include a processing system 1704 that controls operation of the apparatus 1702. The processing system 1704 may also be referred to as a central processing unit (CPU). A memory component 1706 (e.g., including a memory device), which may include both read-only memory (ROM) and random access memory (RAM), provides instructions and data to the processing system 1704. A portion of the memory component 1706 may also include non-volatile random access memory (NVRAM). The processing system 1704 typically performs logical and arithmetic operations based on program instructions stored within the memory component 1706. The instructions in the memory component 1706 may be executable to implement the methods described herein.

When the apparatus 1702 is implemented or used as a transmitting node, the processing system 1704 may be configured to select one of a plurality of media access control (MAC) header types, and to generate a packet having that MAC header type. For example, the processing system 1704 may be configured to generate a packet comprising a MAC header and a payload and to determine what type of MAC header to use.

When the apparatus 1702 is implemented or used as a receiving node, the processing system 1704 may be configured to process packets of a plurality of different MAC header types. For example, the processing system 1704 may be configured to determine the type of MAC header used in a packet and process the packet and/or fields of the MAC header.

The processing system 1704 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 1702 may also include a housing 1708 that may include a transmitter 1710 and a receiver 1712 to allow transmission and reception of data between the apparatus 1702 and a remote location. The transmitter 1710 and receiver 1712 may be combined into single communication device (e.g., a transceiver 1714). An antenna 1716 may be attached to the housing 1708 and electrically coupled to the transceiver 1714. The apparatus 1702 may also include (not shown) multiple transmitters, multiple receivers, multiple transceivers, and/or multiple antennas. A transmitter 1710 and a receiver 1712 may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The transmitter 1710 may be configured to wirelessly transmit packets having different MAC header types. For example, the transmitter 1710 may be configured to transmit packets with different types of headers generated by the processing system 1704, discussed above.

The receiver 1712 may be configured to wirelessly receive packets having different MAC header type. In some aspects, the receiver 1712 is configured to detect a type of a MAC header used and process the packet accordingly.

The receiver 1712 may be used to detect and quantify the level of signals received by the transceiver 1714. The receiver 1712 may detect such signals as total energy, energy per subcarrier per symbol, power spectral density and other signals. The apparatus 1702 may also include a digital signal processor (DSP) 1720 for use in processing signals. The DSP 1720 may be configured to generate a data unit for transmission. In some aspects, the data unit may comprise a physical layer data unit (PPDU). In some aspects, the PPDU is referred to as a packet.

The apparatus 1702 may further comprise a user interface 1722 in some aspects. The user interface 1722 may comprise a keypad, a microphone, a speaker, and/or a display. The user interface 1722 may include any element or component that conveys information to a user of the apparatus 1702 and/or receives input from the user.

The various components of the apparatus 1702 may be coupled together by a bus system 1726. The bus system 1726 may include a data bus, for example, as well as a power bus, a control signal bus, and a status signal bus in addition to the data bus. Those of skill in the art will appreciate the components of the apparatus 1702 may be coupled together or accept or provide inputs to each other using some other mechanism.

Although a number of separate components are illustrated in FIG. 17, one or more of the components may be combined or commonly implemented. For example, the processing system 1704 may be used to implement not only the functionality described above with respect to the processing system 1704, but also to implement the functionality described above with respect to the transceiver 1714 and/or the DSP 1720. Further, each of the components illustrated in FIG. 17 may be implemented using a plurality of separate elements. Furthermore, the processing system 1704 may be used to implement any of the components, modules, circuits, or the like described below, or each may be implemented using a plurality of separate elements.

For ease of reference, when the apparatus 1702 is configured as a transmitting node, it is hereinafter referred to as an apparatus 1702*t*. Similarly, when the apparatus 1702 is configured as a receiving node, it is hereinafter referred to as an apparatus 1702*r*. A device in the wireless communication system 1600 may implement only functionality of a transmitting node, only functionality of a receiving node, or functionality of both a transmitting node and a receive node.

As discussed above, the apparatus 1702 may comprise an AP 1604 or a STA 1606, and may be used to transmit and/or receive communication having a plurality of MAC header types.

The components of FIG. 17 may be implemented in various ways. In some implementations, the components of FIG. 17 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 17 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 18:
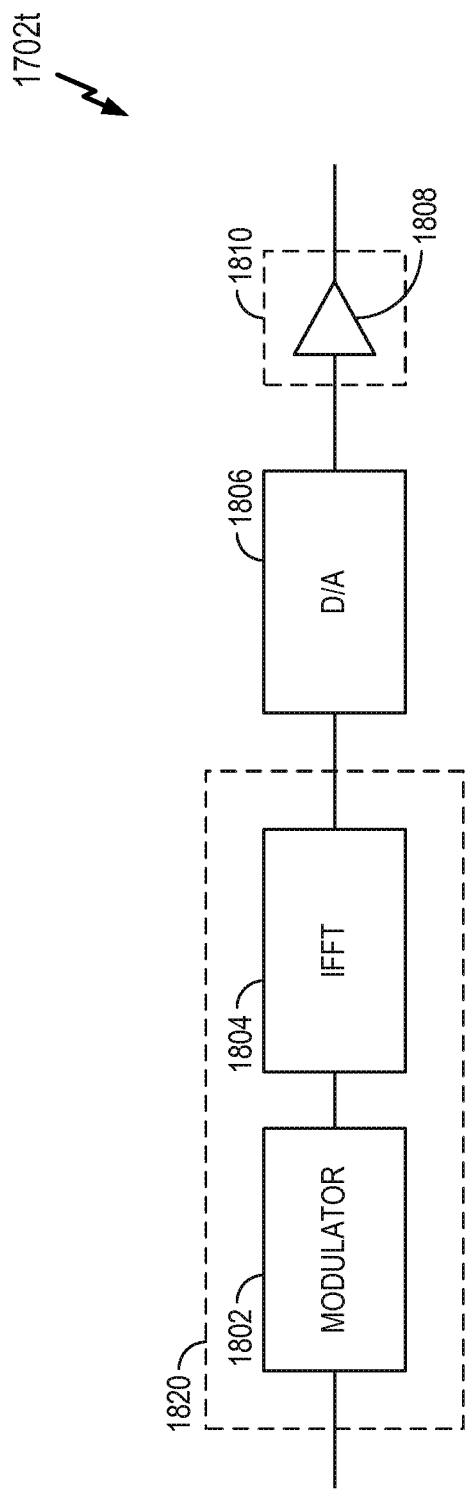
FIG. 18 is a functional block diagram illustrating example components that may be utilized in the apparatus of FIG. 17 to transmit wireless communication.

As discussed above, the apparatus 1702 may comprise an AP 1604 or a STA 1606, a relay, or some other type of apparatus, and may be used to transmit and/or receive communication. FIG. 18 illustrates various components that may be utilized in the apparatus 1702*t* to transmit wireless communication. The components illustrated in FIG. 18 may be used, for example, to transmit OFDM communication. In some aspects, the components illustrated in FIG. 18 are used to generate and transmit packets to be sent over a bandwidth of less than or equal to 1 MHz.

The apparatus 1702*t* of FIG. 18 may comprise a modulator 1802 configured to modulate bits for transmission. For example, the modulator 1802 may determine a plurality of symbols from bits received from the processing system 1704 (FIG. 17) or the user interface 1722 (FIG. 17), for example by mapping bits to a plurality of symbols according to a constellation. The bits may correspond to user data or to control information. In some aspects, the bits are received in codewords. In one aspect, the modulator 1802 comprises a QAM (quadrature amplitude modulation) modulator, for example a 16-QAM modulator or a 64-QAM modulator. In other aspects, the modulator 1802 comprises a binary phase-shift keying (BPSK) modulator or a quadrature phase-shift keying (QPSK) modulator.

The apparatus 1702*t* may further comprise a transform module 1804 configured to convert symbols or otherwise modulated bits from the modulator 1802 into a time domain. In FIG. 18, the transform module 1804 is illustrated as being implemented by an inverse fast Fourier transform (IFFT) module. In some implementations, there may be multiple transform modules (not shown) that transform units of data of different sizes. In some implementations, the transform module 1804 may be itself configured to transform units of data of different sizes. For example, the transform module 1804 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 1804 may be referred to as the size of the transform module 1804.

In FIG. 18, the modulator 1802 and the transform module 1804 are illustrated as being implemented in the DSP 1820. In some aspects, however, one or both of the modulator 1802 and the transform module 1804 are implemented in the processing system 1704 or in another element of the apparatus 1702t (e.g., see description above with reference to FIG. 17).

As discussed above, the DSP 1820 may be configured to generate a data unit for transmission. In some aspects, the modulator 1802 and the transform module 1804 may be configured to generate a data unit comprising a plurality of fields including control information and a plurality of data symbols.

Returning to the description of FIG. 18, the apparatus 1702t may further comprise a digital to analog converter 1806 configured to convert the output of the transform module into an analog signal. For example, the time-domain output of the transform module 1806 may be converted to a baseband OFDM signal by the digital to analog converter 1806. The digital to analog converter 1806 may be implemented in the processing system 1704 or in another element of the apparatus 1702 of FIG. 17. In some aspects, the digital to analog converter 1806 is implemented in the transceiver 1714 (FIG. 17) or in a data transmit processor.

The analog signal may be wirelessly transmitted by the transmitter 1810. The analog signal may be further processed before being transmitted by the transmitter 1810, for example by being filtered or by being upconverted to an intermediate or carrier frequency. In the aspect illustrated in FIG. 18, the transmitter 1810 includes a transmit amplifier 1808. Prior to being transmitted, the analog signal may be amplified by the transmit amplifier 1808. In some aspects, the amplifier 1808 comprises a low noise amplifier (LNA).

The transmitter 1810 is configured to transmit one or more packets or data units in a wireless signal based on the analog signal. The data units may be generated using the processing system 1704 (FIG. 17) and/or the DSP 1820, for example using the modulator 1802 and the transform module 1804 as discussed above. Data units that may be generated and transmitted as discussed above are described in additional detail below.

Figure 19:
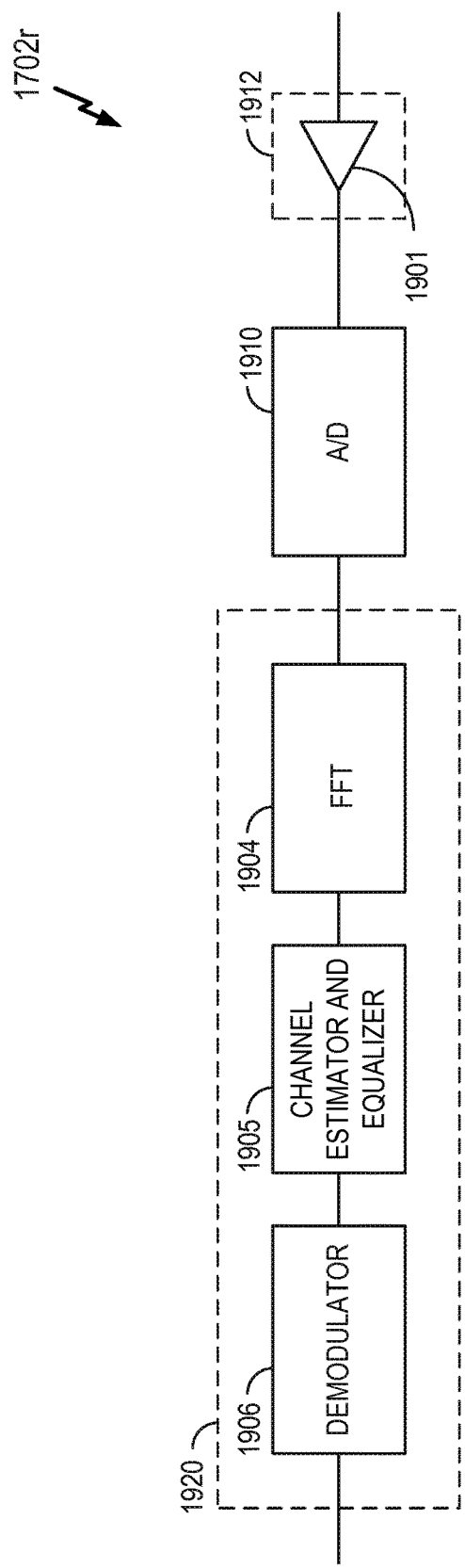
FIG. 19 is a functional block diagram illustrating example components that may be utilized in the apparatus of FIG. 17 to receive wireless communication.

FIG. 19 illustrates various components that may be utilized in the apparatus 1702 of FIG. 17 to receive wireless communication. The components illustrated in FIG. 19 may be used, for example, to receive OFDM communication. For example, the components illustrated in FIG. 19 may be used to receive data units transmitted by the components discussed above with respect to FIG. 18.

The receiver 1912 of apparatus 1702r is configured to receive one or more packets or data units in a wireless signal. Data units that may be received and decoded or otherwise processed as discussed below.

In the aspect illustrated in FIG. 19, the receiver 1912 includes a receive amplifier 1901. The receive amplifier 1901 may be configured to amplify the wireless signal received by the receiver 1912. In some aspects, the receiver 1912 is configured to adjust the gain of the receive amplifier 1901 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 1901 comprises an LNA.

The apparatus 1702r may comprise an analog to digital converter 1910 configured to convert the amplified wireless signal from the receiver 1912 into a digital representation thereof. Further to being amplified, the wireless signal may be processed before being converted by the digital to analog converter 1910, for example by being filtered or by being downconverted to an intermediate or baseband frequency. The analog to digital converter 1910 may be implemented in the processing system 1704 (FIG. 17) or in another element of the apparatus 1702r. In some aspects, the analog to digital converter 1910 is implemented in the transceiver 1714 (FIG. 17) or in a data receive processor.

The apparatus 1702r may further comprise a transform module 1904 configured to convert the representation of the wireless signal into a frequency spectrum. In FIG. 19, the transform module 1904 is illustrated as being implemented by a fast Fourier transform (FFT) module. In some aspects, the transform module may identify a symbol for each point that it uses. As described above with reference to FIG. 18, the transform module 1904 may be configured with a plurality of modes, and may use a different number of points to convert the signal in each mode. The number of points used by the transform module 1904 may be referred to as the size of the transform module 1904. In some aspects, the transform module 1904 may identify a symbol for each point that it uses.

The apparatus 1702r may further comprise a channel estimator and equalizer 1905 configured to form an estimate of the channel over which the data unit is received, and to remove certain effects of the channel based on the channel estimate. For example, the channel estimator 1905 may be configured to approximate a function of the channel, and the channel equalizer may be configured to apply an inverse of that function to the data in the frequency spectrum.

The apparatus 1702r may further comprise a demodulator 1906 configured to demodulate the equalized data. For example, the demodulator 1906 may determine a plurality of bits from symbols output by the transform module 1904 and the channel estimator and equalizer 1905, for example by reversing a mapping of bits to a symbol in a constellation. The bits may be processed or evaluated by the processing system 1704 (FIG. 17), or used to display or otherwise output information to the user interface 1722 (FIG. 17). In this way, data and/or information may be decoded. In some aspects, the bits correspond to codewords. In one aspect, the demodulator 1906 comprises a QAM (quadrature amplitude modulation) demodulator, for example a 16-QAM demodulator or a 64-QAM demodulator. In other aspects, the demodulator 1906 comprises a binary phase-shift keying (BPSK) demodulator or a quadrature phase-shift keying (QPSK) demodulator.

In FIG. 19, the transform module 1904, the channel estimator and equalizer 1905, and the demodulator 1906 are illustrated as being implemented in the DSP 1920. In some aspects, however, one or more of the transform module 1904, the channel estimator and equalizer 1905, and the demodulator 1906 are implemented in the processing system 1704 (FIG. 17) or in another element of the apparatus 1702 (FIG. 17).

As discussed above, the wireless signal received at the receiver 1712 comprises one or more data units. Using the functions or components described above, the data units or data symbols therein may be decoded evaluated or otherwise evaluated or processed. For example, the processing system 1704 (FIG. 17) and/or the DSP 1920 may be used to decode data symbols in the data units using the transform module 1904, the channel estimator and equalizer 1905, and the demodulator 1906.

Data units exchanged by the AP 1604 and the STA 1606 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 1702t shown in FIG. 18 shows an example of a single transmit chain to be transmitted over an antenna. The apparatus 1702r shown in FIG. 19 shows an example of a single receive chain to be received over an antenna. In some implementations, the apparatus 1702t or 1702r may implement a portion of a MIMO system using multiple antennas to simultaneously transmit data.

The wireless network 1600 may employ methods to allow efficient access of the wireless medium based on unpredictable data transmissions while avoiding collisions. As such, in accordance with various aspects, the wireless network 1600 performs carrier sense multiple access/collision avoidance (CSMA/CA) that may be referred to as the Distributed Coordination Function (DCF). More generally, an apparatus 1702 having data for transmission senses the wireless medium to determine if the channel is already occupied. If the apparatus 1702 senses the channel is idle then the apparatus 1702 transmits prepared data. Otherwise, the apparatus 1702 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus comprises a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may comprise an access point, a relay, or an access terminal.

An access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may comprise, be implemented as, or known as a relay node, a relay device, a relay station, a relay apparatus, or some other similar terminology. As discussed above, in some aspects, a relay may comprise some access terminal functionality and some access point functionality.

In some aspects, a wireless apparatus comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1×RTT, 1×EV-DO Re10, RevA, RevB) technology and other technologies.

Figure 20:
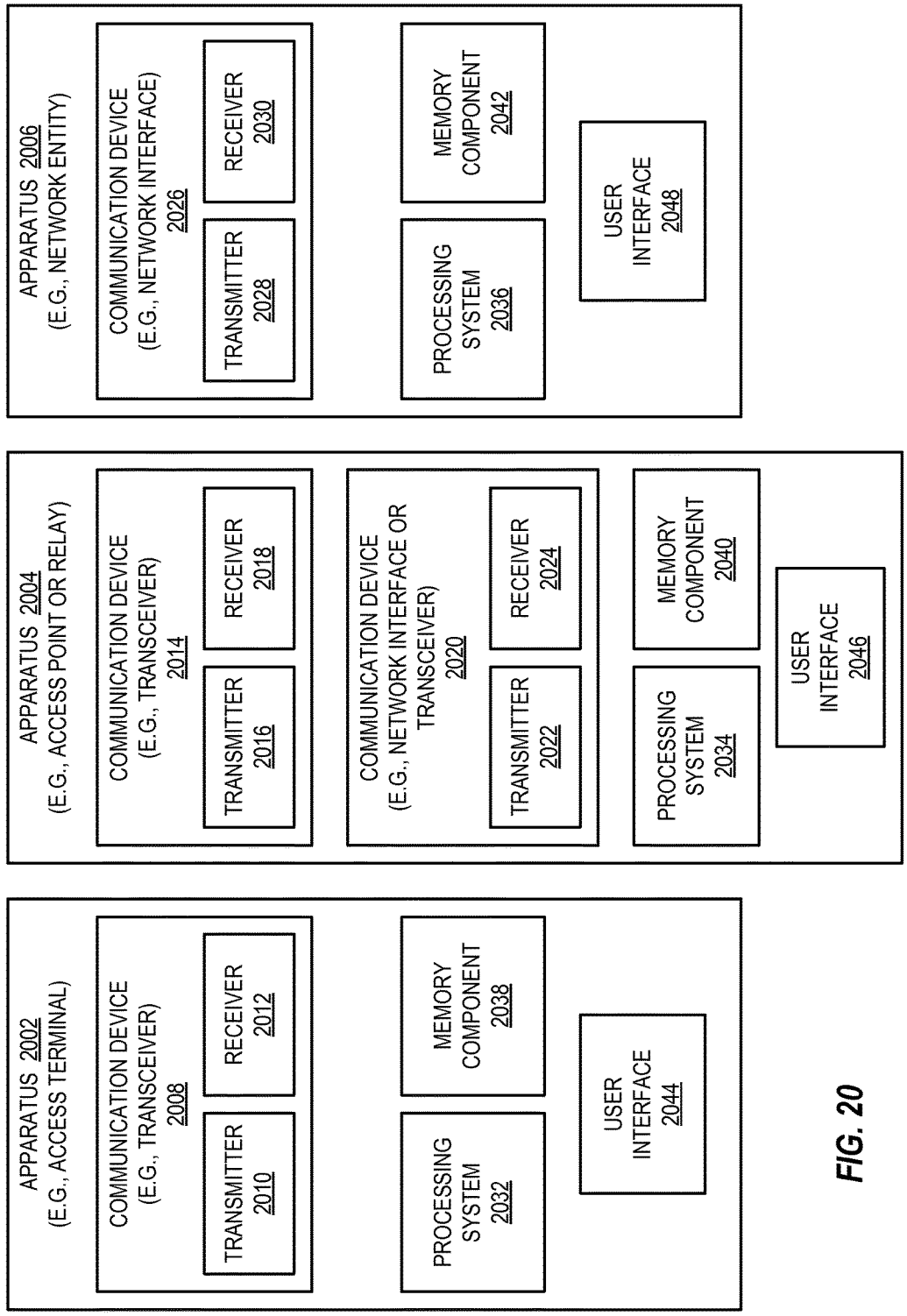
FIG. 20 is a functional block diagram illustrating several sample aspects of components that may be employed in communication nodes in accordance with some aspects of the disclosure.

FIG. 20 illustrates several sample components (represented by corresponding blocks) that may be incorporated into an apparatus 2002, an apparatus 2004, and an apparatus 2006 (e.g., corresponding to an access terminal, an access point or relay, and a network entity, respectively) to perform communication operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 2002 and the apparatus 2004 each include at least one wireless communication device (represented by the communication devices 2008 and 2014 (and the communication device 2020 if the apparatus 2004 is a relay)) for communicating with other nodes via at least one designated radio access technology. Each communication device 2008 includes at least one transmitter (represented by the transmitter 2010) for transmitting and encoding signals (e.g., messages, indications, information, and so on) and at least one receiver (represented by the receiver 2012) for receiving and decoding signals (e.g., messages, indications, information, pilots, and so on). Similarly, each communication device 2014 includes at least one transmitter (represented by the transmitter 2016) for transmitting signals (e.g., messages, indications, information, pilots, and so on) and at least one receiver (represented by the receiver 2018) for receiving signals (e.g., messages, indications, information, and so on). If the apparatus 2004 is a relay, each communication device 2020 includes at least one transmitter (represented by the transmitter 2022) for transmitting signals (e.g., messages, indications, information, pilots, and so on) and at least one receiver (represented by the receiver 2024) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 2004 comprises a network listen module.

The apparatus 2006 (and the apparatus 2004 if it is an access point) includes at least one communication device (represented by the communication device 2026 and, optionally, 2020) for communicating with other nodes. For example, the communication device 2026 may comprise a network interface that is configured to communicate with one or more network entities via a wire-based or wireless backhaul. In some aspects, the communication device 2026 may be implemented as a transceiver configured to support wire-based or wireless signal communication. This communication may involve, for example, sending and receiving: messages, parameters, or other types of information. Accordingly, in the example of FIG. 20, the communication device 2026 is shown as comprising a transmitter 2028 and a receiver 2030. Similarly, if the apparatus 2004 is an access point, the communication device 2020 may comprise a network interface that is configured to communicate with one or more network entities via a wire-based or wireless backhaul. As with the communication device 2026, the communication device 2020 is shown as comprising a transmitter 2022 and a receiver 2024.

The apparatuses 2002, 2004, and 2006 also include other components that may be used in conjunction with communication operations as taught herein. The apparatus 2002 includes a processing system 2032 for providing functionality relating to, for example, receiving frames and taking action thereon as taught herein and for providing other processing functionality. The apparatus 2004 includes a processing system 2034 for providing functionality relating to, for example, generating and transmitting frames as taught herein and for providing other processing functionality. The apparatus 2006 includes a processing system 2036 for providing functionality relating to, for example, supporting communication between the apparatuses 2002 and 2004 as taught herein and for providing other processing functionality. The apparatuses 2002, 2004, and 2006 include memory devices 2038, 2040, and 2042 (e.g., each including a memory device), respectively, for maintaining information (e.g., thresholds, parameters, mapping information, and so on). In addition, the apparatuses 2002, 2004, and 2006 include user interface devices 2044, 2046, and 2048, respectively, for providing indications (e.g., audible and/or visual indications) to a user and/or for receiving user input (e.g., upon user actuation of a sensing device such a keypad, a touch screen, a microphone, and so on).

For convenience, the apparatus 2002 is shown in FIG. 20 as including components that may be used in the various examples described herein. In practice, the illustrated blocks may have different functionality in different aspects. For example, functionality of the block 2034 for supporting the implementation of FIG. 3 may be different as compared to functionality of the block 2034 for supporting the implementation of FIG. 11.

The components of FIG. 20 may be implemented in various ways. In some implementations, the components of FIG. 20 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 2008, 2032, 2038, and 2044 may be implemented by processor and memory component(s) of the apparatus 2002 (e.g., by execution of appropriate code and/or by appropriate configuration of processor components). Similarly, some or all of the functionality represented by blocks 2014, 2020, 2034, 2040, and 2046 may be implemented by processor and memory component(s) of the apparatus 2004 (e.g., by execution of appropriate code and/or by appropriate configuration of processor components). Also, some or all of the functionality represented by blocks 2026, 2036, 2042, and 2048 may be implemented by processor and memory component(s) of the apparatus 2006 (e.g., by execution of appropriate code and/or by appropriate configuration of processor components).

Figure 21:
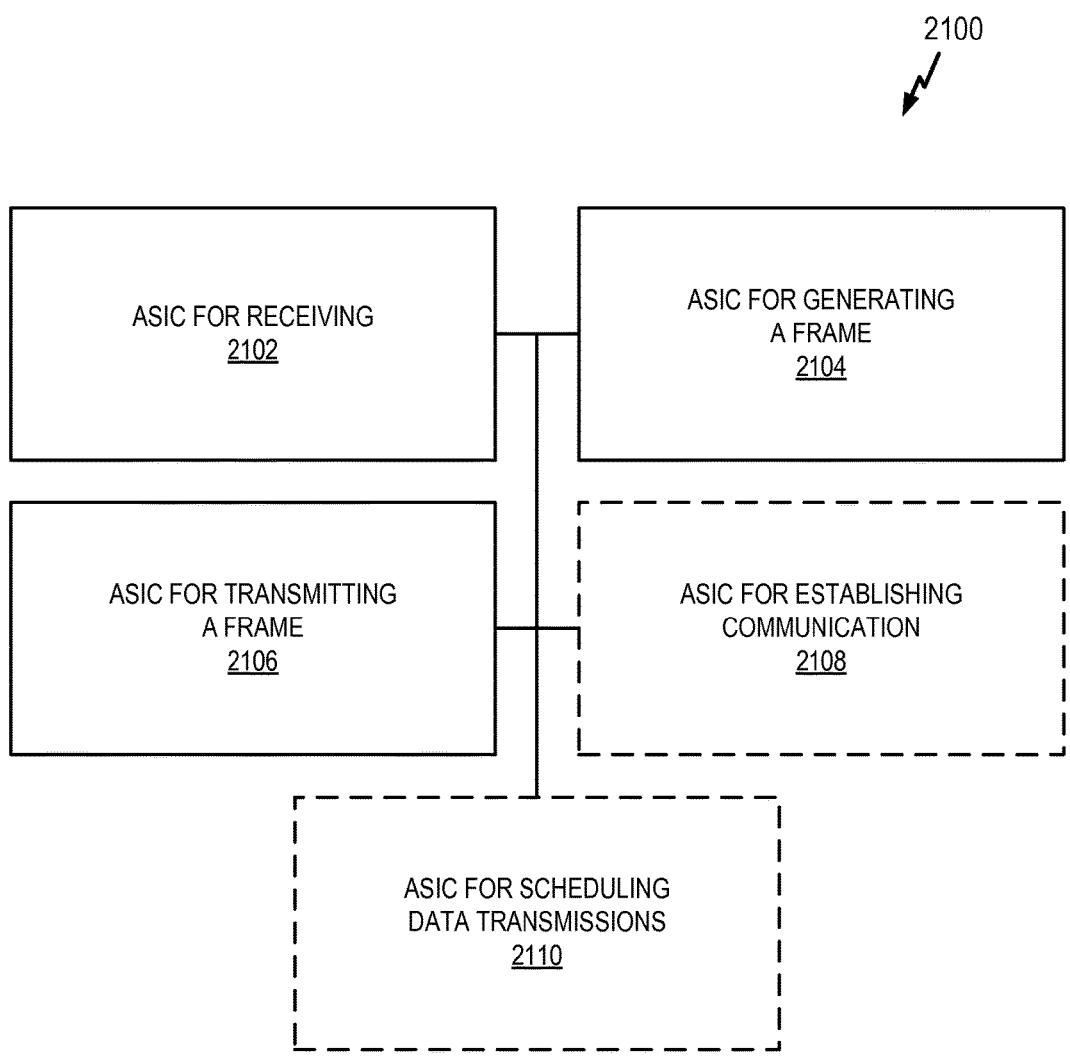
FIGS. 21-23 are functional block diagrams illustrating several sample aspects of apparatuses configured with functionality relating to usage of a frame comprising an acknowledgement and scheduling information in accordance with some aspects of the disclosure.
Figure 22:
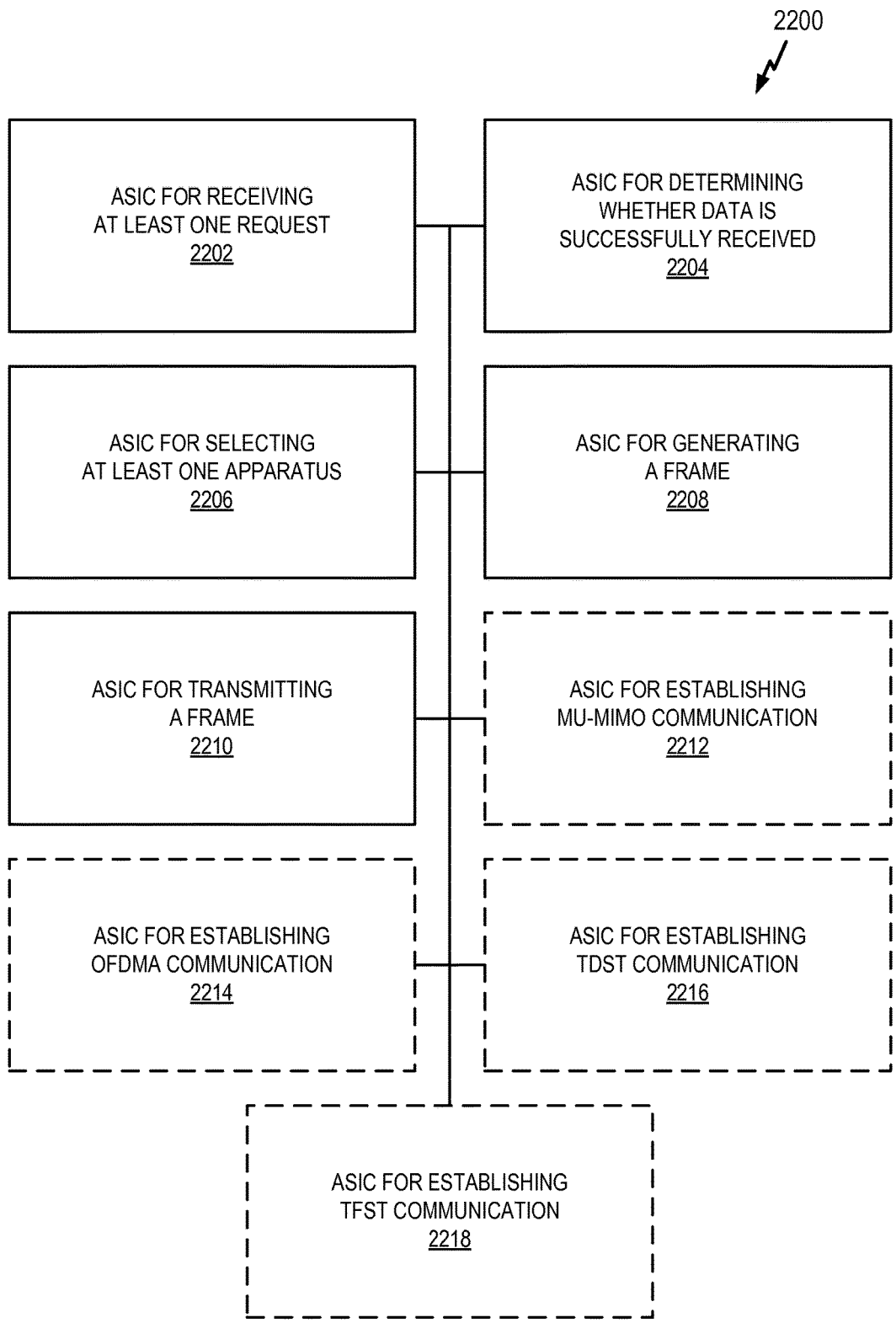
Figure 23:
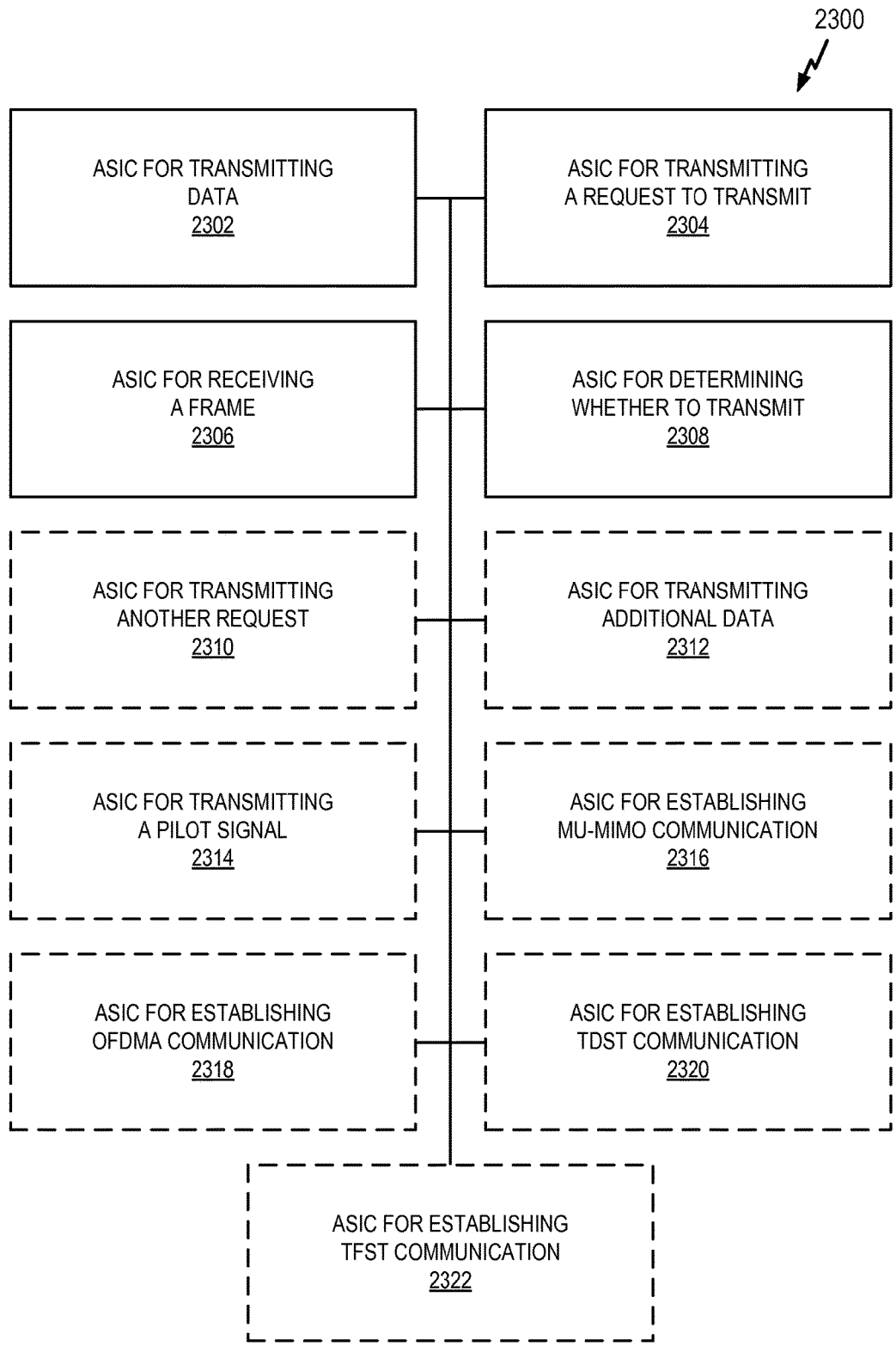

The components described herein may be implemented in a variety of ways. Referring to FIGS. 21, 22, and 23, apparatuses 2100, 2200, and 2300 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 2100 includes one or more modules that may perform one or more of the functions described above with regard to various figures. For example, an ASIC for receiving 2102 may correspond to, for example, a receiver as discussed herein. An ASIC for generating a frame 2104 may correspond to, for example, a processing system as discussed herein. An ASIC for transmitting a frame 2106 may correspond to, for example, a transmitter as discussed herein. An ASIC for establishing communication 2108 may correspond to, for example, a processing system as discussed herein. An ASIC for scheduling data transmissions 2110 may correspond to, for example, a processing system as discussed herein.

The apparatus 2200 includes one or more modules that may perform one or more of the functions described above with regard to various figures. For example, an ASIC for receiving at least one request 2202 may correspond to, for example, a receiver as discussed herein. An ASIC for determining whether data is successfully received 2204 may correspond to, for example, a processing system as discussed herein. An ASIC for selecting at least one apparatus 2206 may correspond to, for example, a processing system as discussed herein. An ASIC for generating a frame 2208 may correspond to, for example, a processing system as discussed herein. An ASIC for transmitting a frame 2210 may correspond to, for example, a transmitter as discussed herein. An ASIC for establishing MU-MIMO (e.g., UL MU-MIMO) communication 2212 may correspond to, for example, a processing system as discussed herein. An ASIC for establishing OFDMA (e.g., UL OFDMA) communication 2214 may correspond to, for example, a processing system as discussed herein. An ASIC for establishing TDST (e.g., UL TDST) communication 2216 may correspond to, for example, a processing system as discussed herein. An ASIC for establishing TFST (e.g., UL TFST) communication 2218 may correspond to, for example, a processing system as discussed herein.

The apparatus 2300 includes one or more modules that may perform one or more of the functions described above with regard to various figures. For example, an ASIC for transmitting data 2302 may correspond to, for example, a transmitter as discussed herein. An ASIC for transmitting a request to transmit 2304 may correspond to, for example, a transmitter as discussed herein. An ASIC for receiving a frame 2306 may correspond to, for example, a receiver as discussed herein. An ASIC for determining whether to transmit 2308 may correspond to, for example, a processing system as discussed herein. An ASIC for transmitting another request 2310 may correspond to, for example, a transmitter as discussed herein. An ASIC for transmitting additional data 2312 may correspond to, for example, a transmitter as discussed herein. An ASIC for transmitting a pilot signal 2314 may correspond to, for example, a transmitter as discussed herein. An ASIC for establishing MU-MIMO (e.g., UL MU-MIMO) communication 2316 may correspond to, for example, a processing system as discussed herein. An ASIC for establishing OFDMA (e.g., UL OFDMA) communication 2318 may correspond to, for example, a processing system as discussed herein. An ASIC for establishing TDST (e.g., UL TDST) communication 2320 may correspond to, for example, a processing system as discussed herein. An ASIC for establishing TFST (e.g., UL TFST) communication 2322 may correspond to, for example, a processing system as discussed herein.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes are optional.

As noted above, the apparatuses 2100-2300 comprise one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 2200 may comprise a single device (e.g., with components 2202-2218 comprising different sections of an ASIC). As another specific example, the apparatus 2200 may comprise several devices (e.g., with the components 2202 and 2210 comprising one ASIC, and the components 2204, 2206, 2208, 2212, 2214, 2216, and 2218 comprising another ASIC).

In addition, the components and functions represented by FIGS. 21-23 as well as other components and functions described herein, may be implemented using any suitable means. Such means are implemented, at least in part, using corresponding structure as taught herein. For example, the components described above in conjunction with the "ASIC for" components of FIGS. 21-23 correspond to similarly designated "means for" functionality. Thus, one or more of such means is implemented using one or more of processor components, integrated circuits, or other suitable structure as taught herein in some implementations. Several examples follow.

In some implementations, communication device structure such as a transceiver is configured to embody the functionality of a means for receiving. For example, this structure may be programmed or designed to invoke a receive operation. In addition, this structure may be programmed or designed to process (e.g., demodulate and decode) any signals received as a result of the receive operation. In addition, this structure may be programmed or designed to output data (e.g., a data unit, a frame, a request, an indication, or other information) extracted from the received signals as a result of the processing. Typically, the communication device structure comprises a wireless-based transceiver device or wire-based transceiver device.

In some implementations, communication device structure such as a transceiver is configured to embody the functionality of a means for transmitting. For example, this structure may be programmed or designed to obtain data (e.g., a data unit, a frame, a request, a pilot, an indication, or other information) to be transmitted. In addition, this structure may be programmed or designed to process (e.g., modulate and encode) the obtained data. In addition, this structure may be programmed or designed to couple the processed data to one or more antennas for transmission. Typically, the communication device structure comprises a wireless-based transceiver device or wire-based transceiver device.

In some implementations, processing system structure such as an ASIC or a programmable processor is configured to embody the functionality of a means for establishing communication. For example, this structure may be programmed or designed to obtain data (e.g., a data unit, a frame, an indication, or other information) to be communicated. In addition, this structure may be programmed or designed to process the obtained data. In addition, this structure may be programmed or designed to output the data. Complementary operations may be performed to receive data.

In some implementations, processing system structure such as an ASIC or a programmable processor is configured to embody the functionality of a means for determining whether to transmit. This structure may be programmed or designed to receive an input parameter. This structure may be programmed or designed to process the received operating parameter to control one or more transmit operations. The structure may be programmed or designed to then output an indication indicative of the results of the processing (e.g., to a transmitter).

In some implementations, processing system structure such as an ASIC or a programmable processor is configured to embody the functionality of a means for determining whether data is successfully received. This structure may be programmed or designed to receive data (e.g., from a receiver or a memory device). This structure may be programmed or designed to process the received data to determine whether there is an error associated with the data (e.g., by performing a CRC operation). The structure may be programmed or designed to then output an indication indicative of the results of the processing (e.g., a pass or fail indication).

In some implementations, processing system structure such as an ASIC or a programmable processor is configured to embody the functionality of a means for selecting at least one apparatus. This structure may be programmed or designed to receive one or more input parameters. This structure may be programmed or designed to perform a selection operation based on defined selection criteria and the received input parameters. The structure may be programmed or designed to then output an indication indicative of the results of the selection.

In some implementations, processing system structure such as an ASIC or a programmable processor is configured to embody the functionality of a means for generating a frame. This structure may be programmed or designed to receive information to be included in a frame. This structure may be programmed or designed to process the received information to provide the information in a designate frame format. The structure may be programmed or designed to then output an indication indicative of the results of the processing (e.g., a formatted frame).

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code executable (e.g., executable by at least one computer) to provide functionality relating to one or more of the aspects of the disclosure. In some aspects, a computer program product may comprise packaging materials.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product. Although particular aspects are described herein, many variations and permutations of these aspects fall within the scope of the disclosure.

Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the description.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
   a receiver configured to receive data and one or more requests to transmit other data;
   a processing system configured to generate an acknowledgment frame comprising acknowledgment information associated with the received data and scheduling information associated with the received one or more requests to transmit the other data, wherein the acknowledgment frame further comprises a duration for transmission of the other data and for transmission of subsequent requests to transmit; and
   an interface configured to output the acknowledgment frame for transmission to at least one of second apparatuses.

2. The apparatus of claim 1, wherein the acknowledgment information indicates, for each of the second apparatuses, whether the data was successfully received from the second apparatus.

3. The apparatus of claim 1, wherein the acknowledgment frame indicates an order to be used for pilot transmissions in a transmission associated with at least one of the requests to transmit other data.

4. The apparatus of claim 1, wherein the acknowledgment frame indicates an order to be used for data transmissions based on the requests to transmit the other data.

5. The apparatus of claim 1, wherein the acknowledgment frame indicates a start time for the transmission of the subsequent requests to transmit.

6. The apparatus of claim 1, wherein the acknowledgment frame indicates a start time and a duration for at least one scheduled data transmission.

7. The apparatus of claim 1, wherein:
   the acknowledgment frame identifies a plurality of the second apparatuses that are scheduled to transmit data; and
   the acknowledgment frame indicates, for each of the identified second apparatuses, a start time and a duration for the scheduled data transmission for the identified second apparatus.

8. The apparatus of claim 1, wherein:
   the acknowledgment frame identifies a plurality of the second apparatuses that are scheduled to transmit data; and
   the acknowledgment frame indicates, for each of the identified second apparatuses, an allocated time-frequency resource for a scheduled data transmission for the identified second apparatus.

9. The apparatus of claim 1, wherein:
   the acknowledgment frame identifies a plurality of the second apparatuses that are scheduled to transmit data; and
   the acknowledgment frame indicates, for each of the identified second apparatuses, the transmission rate for a scheduled data transmission for the identified second apparatus.

10. The apparatus of claim 1, wherein:
    the acknowledgment frame identifies a plurality of the second apparatuses that are scheduled to transmit data; and
    the information indicating the transmission rate indicates, for each of the identified second apparatuses, a modulation and coding scheme for a scheduled data transmission for the identified second apparatus.

11. The apparatus of claim 1, wherein the processing system is further configured to:
    establish multi-user multiple-input multiple-output (MU-MIMO) communication with the second apparatuses; and
    schedule data transmissions according to the established MU-MIMO communication.

12. The apparatus of claim 1, wherein the processing system is further configured to:
    establish orthogonal-frequency-division-multiple-access (OFDMA) communication with the second apparatuses; and
    schedule data transmissions according to the established OFDMA communication.

13. The apparatus of claim 1, wherein the processing system is further configured to:
    establish time-domain-scheduled-transmission (TDST) communication with the second apparatuses; and
    schedule data transmissions according to the established TDST communication.

14. The apparatus of claim 1, wherein the processing system is further configured to:
    establish time-frequency-scheduled-transmission (TFST) communication with a the second apparatuses; and
    schedule data transmissions according to the established TFST communication.

15. An access point, comprising:
    a receiver configured to receive data and one or more requests to transmit other data;
    a processing system configured to generate an acknowledgment frame comprising acknowledgment information associated with the received data and scheduling information associated with the received one or more requests to transmit the other data, wherein the acknowledgment frame further comprises a duration for transmission of the other data and for transmission of subsequent requests to transmit; and
    a transmitter configured to transmit the acknowledgment frame to at least one of second apparatuses.

16. An apparatus for wireless communication, comprising:
    a receiver configured to receive data and one or more requests to transmit;
    a processing system configured to generate a media access control (MAC) frame comprising:
       acknowledgment information associated with the received data, and
       scheduling information associated with the received one or more requests to transmit, wherein the scheduling information identifies second apparatuses that are scheduled to transmit data and indicates, for each of the identified second apparatuses, a modulation and coding scheme for a scheduled data transmission for the identified second apparatus; and
    an interface configured to output the MAC frame for transmission.

17. The apparatus of claim 16, wherein the acknowledgment information indicates, for each of the second apparatuses, whether the data was successfully received from the second apparatus.

18. The apparatus of claim 16, wherein the MAC frame indicates an order to be used for pilot transmissions in a transmission associated with at least one of the requests to transmit other data.

19. The apparatus of claim 16, wherein the MAC frame indicates an order to be used for data transmissions based on the requests to transmit the other data.

20. The apparatus of claim 16, wherein the MAC frame indicates a start time for the transmission of the subsequent requests to transmit.

21. The apparatus of claim 16, wherein the MAC frame indicates a start time and a duration for at least one scheduled data transmission.

22. The apparatus of claim 16, wherein the scheduling information further indicates, for each of the identified second apparatuses, a start time and a duration for the scheduled data transmission for the identified second apparatus.

23. The apparatus of claim 16, wherein the scheduling information further indicates, for each of the identified second apparatuses, an allocated time-frequency resource for a scheduled data transmission for the identified second apparatus.

24. The apparatus of claim 16, wherein the scheduling information further indicates, for each of the identified second apparatuses, the transmission rate for a scheduled data transmission for the identified second apparatus.

25. The apparatus of claim 16, wherein the processing system is further configured to:
establish multi-user multiple-input multiple-output (MU-MIMO) communication with the second apparatuses; and
schedule data transmissions according to the established MU-MIMO communication.

26. The apparatus of claim 16, wherein the processing system is further configured to:
establish orthogonal-frequency-division-multiple-access (OFDMA) communication with the second apparatuses; and
schedule data transmissions according to the established OFDMA communication.

27. The apparatus of claim 16, wherein the processing system is further configured to:
establish time-domain-scheduled-transmission (TDST) communication with the second apparatuses; and
schedule data transmissions according to the established TDST communication.

28. The apparatus of claim 16, wherein the processing system is further configured to:
establish time-frequency-scheduled-transmission (TFST) communication with the second apparatuses; and
schedule data transmissions according to the established TFST communication.

29. An access point, comprising:
a receiver configured to receive data and one or more requests to transmit;
a processing system configured to generate a media access control (MAC) frame comprising:
acknowledgment information associated with the received data, and
scheduling information associated with the received one or more requests to transmit, wherein the scheduling information identifies a plurality of second apparatuses that are scheduled to transmit data and indicates, for each of the identified second apparatuses, a modulation and coding scheme for a scheduled data transmission for the identified second apparatus; and
a transmitter configured to transmit the MAC frame.

* * * * *